United States Patent
Kim

(10) Patent No.: US 11,521,071 B2
(45) Date of Patent: Dec. 6, 2022

(54) UTILIZING DEEP RECURRENT NEURAL NETWORKS WITH LAYER-WISE ATTENTION FOR PUNCTUATION RESTORATION

(71) Applicant: Adobe Inc., San Jose, CA (US)

(72) Inventor: Seokhwan Kim, San Jose, CA (US)

(73) Assignee: Adobe Inc., San Jose, CA (US)

(*) Notice: Subject to any disclaimer, the term of this patent is extended or adjusted under 35 U.S.C. 154(b) by 876 days.

(21) Appl. No.: 16/411,490

(22) Filed: May 14, 2019

(65) Prior Publication Data
US 2020/0364576 A1 Nov. 19, 2020

(51) Int. Cl.
*G06F 40/30* (2020.01)
*G06N 20/00* (2019.01)
*G06N 3/08* (2006.01)
*G06N 3/04* (2006.01)
*G06K 9/62* (2022.01)
*G06F 40/58* (2020.01)
*G06F 40/211* (2020.01)

(52) U.S. Cl.
CPC ........... *G06N 3/084* (2013.01); *G06F 40/211* (2020.01); *G06F 40/58* (2020.01); *G06K 9/6267* (2013.01); *G06N 3/0472* (2013.01)

(58) Field of Classification Search
CPC .... G06F 40/211; G06F 40/253; G06F 40/268; G06F 40/284; G06F 40/30; G10L 15/00; G06N 20/00
See application file for complete search history.

(56) References Cited

U.S. PATENT DOCUMENTS

| | | | | |
|---|---|---|---|---|
| 6,820,237 B1* | 11/2004 | Abu-Hakima | ........ | G06F 40/169 715/250 |
| 9,390,078 B2* | 7/2016 | Israel | .................... | G06F 40/232 |
| 9,442,910 B2* | 9/2016 | Liu | ........................ | G06F 40/166 |
| 2001/0029455 A1* | 10/2001 | Chin | ...................... | G06F 40/58 704/277 |

(Continued)

OTHER PUBLICATIONS

Chen et al., Self-Attention Based Network for Punctuation Restoration, author={Wang, Feng and Chen, Wei and Yang, Zhen and Xu, Bo}, booktitle={2018 24th International Conference on Pattern Recognition (ICPR)}, pp. ={2803-2808}, (Year: 2018).*

(Continued)

*Primary Examiner* — Lamont M Spooner
(74) *Attorney, Agent, or Firm* — Keller Preece PLLC

(57) ABSTRACT

The present disclosure relates to utilizing a deep recurrent neural network for accurately performing punctuation restoration. For example, the disclosed systems can provide a sequence of words to a punctuation restoration neural network having multiple bi-directional recurrent layers and one or more neural attention mechanisms. In one or more embodiments, the punctuation restoration neural network incorporates layer-wise attentions and/or multi-head attention. The disclosed systems can utilize the punctuation restoration neural network to generate probabilities for each word, indicating the likelihood that each possible punctuation mark is associated with that word. Based on these probabilities, the disclosed systems can generate a punctuated transcript that includes punctuation before the appropriate words.

20 Claims, 13 Drawing Sheets

(56) References Cited

U.S. PATENT DOCUMENTS

| | | | |
|---|---|---|---|
| 2014/0149870 A1* | 5/2014 | Griffin | G06F 3/04886 715/728 |
| 2015/0303941 A1* | 10/2015 | Hayes | G06F 40/10 704/201 |
| 2016/0055196 A1* | 2/2016 | Collins | G06F 16/955 707/690 |
| 2019/0043486 A1* | 2/2019 | Salloum | G10L 15/26 |
| 2019/0065462 A1* | 2/2019 | Salloum | G06F 40/44 |
| 2019/0065464 A1* | 2/2019 | Finley | G06F 40/169 |
| 2019/0272818 A1* | 9/2019 | Fernandez | G10L 13/00 |
| 2020/0004803 A1* | 1/2020 | Dernoncourt | G10L 15/26 |
| 2020/0110943 A1* | 4/2020 | Gunawardena | G06V 20/47 |
| 2020/0151555 A1* | 5/2020 | Kozhaya | G06N 3/08 |
| 2020/0226327 A1* | 7/2020 | Matusov | G06F 40/58 |
| 2020/0243094 A1* | 7/2020 | Thomson | H04M 3/42382 |
| 2020/0285951 A1* | 9/2020 | Kim | G06K 9/6232 |
| 2020/0293714 A1* | 9/2020 | Olshanetsky | G06F 11/3696 |

OTHER PUBLICATIONS

Orife, {Attentive Sequence-to-Sequence Learning for Diacritic Restoration of Yor$\backslash$ub$\backslash$'a Language Text}, journal={arXiv preprint arXiv: 1804.00832}, year={2018}, pp. 1-6 (Year: 2018).*

Agustin Gravano, Martin Jansche, and Michiel Bacchiani, "Restoring punctuation and capitalization in transcribed speech," in Proceedings of the 34th IEEE International Conference on Acoustics, Speech, and Signal Processing (ICASSP), 2009, pp. 4741-4744.

Dongdong Zhang, Shuangzhi Wu, Nan Yang, and Mu Li, "Punctuation prediction with transition-based parsing," in Proceedings of the 51st Annual Meeting of the Association for Computational Linguistics (ACL), 2013, vol. 1, pp. 752-760.

Stephan Peitz, Markus Freitag, Arne Mauser, and Hermann Ney, "Modeling punctuation prediction as machine translation," in Proceedings of the International Workshop on Spoken Language Translation (IWSLT), 2011, pp. 238-245.

Eunah Cho, Jan Niehues, Kevin Kilgour, and Alex Waibel, "Punctuation insertion for real-time spoken language translation," in Proceedings of the 12th International Workshop on Spoken Language Translation (IWSLT), 2015, pp. 173-179.

Wei Lu and Hwee Tou Ng, "Better punctuation prediction with dynamic conditional random fields," in Proceedings of the 2010 conference on empirical methods in natural language processing (EMNLP), 2010, pp. 177-186.

Xuancong Wang, Hwee Tou Ng, and Khe Chai Sim, "Dynamic conditional random fields for joint sentence boundary and punctuation prediction," in Proceedings of the 13th Annual Conference of the International Speech Communication Association (INTERSPEECH), 2012, pp. 1384-1387.

Nicola Ueffing, Maximilian Bisani, and Paul Vozila, "Improved models for automatic punctuation prediction for spoken and written text.," in Proceedings of the 14th Annual Conference of the International Speech Communication Association (Interspeech), 2013, pp. 3097-3101.

Xiaoyin Che, Cheng Wang, Haojin Yang, and Christoph Meinel, "Punctuation prediction for unsegmented transcript based on word vector.," in Proceedings of the Tenth International Conference on Language Resources and Evaluation (LREC), 2016, pp. 654-658.

Ottokar Tilk and Tanel Alumae, "LSTM for punctuation restoration in speech transcripts," in Proceedings of the 16th Annual Conference of the International Speech Communication Association (INTERSPEECH), 2015, pp. 683-687.

Vardaan Pahuja, Anirban Laha, Shachar Mirkin, Vikas Raykar, Lili Kotlerman, and Guy Lev, "Joint learning of correlated sequence labelling tasks using bidirectional recurrent neural networks," in Proceedings of the 18th Annual Conference of the International Speech Communication Association (INTERSPEECH), 2017, pp. 548-552.

Ottokar Tilk and Tanel Alumae, "Bidirectional recurrent neural network with attention mechanism for punctuation restoration.," in Proceedings of the 17th Annual Conference of the International Speech Communication Association (INTERSPEECH), 2016, pp. 3047-3051.

Ashish Vaswani, Noam Shazeer, Niki Parmar, Jakob Uszkoreit, Llion Jones, Aidan N Gomez, Lukasz Kaiser, and Illia Polosukhin, "Attention is all you need," in Advances in Neural Information Processing Systems (NIPS), 2017, pp. 5998-6008.

Quoc Le and Tomas Mikolov, "Distributed representations of sentences and documents," in Proceedings of the 31st International Conference on Machine Learning (ICML), 2014, pp. 1188-1196.

Jeffrey Pennington, Richard Socher, and Christopher D. Manning, "Glove: Global vectors for word representation," in Proceedings of the 2014 Conference on Empiri- cal Methods in Natural Language Processing (EMNLP), 2014, pp. 1532-1543.

Kyunghyun Cho, Bart van Merrienboer, Caglar Gulcehre, Dzmitry Bahdanau, Fethi Bougares, Holger Schwenk, and Yoshua Bengio, "Learning phrase representations using rnn encoder-decoder for statistical machine translation," in Proceedings of the 2014 Conference on Empirical Methods in Natural Language Processing (EMNLP), 2014, pp. 1724-1734.

Dzmitry Bahdanau, Kyunghyun Cho, and Yoshua Bengio, "Neural machine translation by jointly learning to align and translate," arXiv preprint arXiv:1409.0473, 2014.

Marcello Federico, Mauro Cettolo, Luisa Bentivogli, Paul Michael, and Stuker Sebastian, "Overview of the IWSLT 2012 evaluation campaign," in Proceedings of the International Workshop on Spoken Language Translation (IWSLT), 2012, pp. 12-33.

Diederik P Kingma and Jimmy Ba, "Adam: A method for stochastic optimization," arXiv:1412.6980, 2014. arXiv preprint.

John Makhoul, Francis Kubala, Richard Schwartz, Ralph Weischedel, et al., "Performance measures for information extraction," in Proceedings of DARPA broad-cast news workshop, 1999, pp. 249-252.

* cited by examiner

| t | $x_t$ | $y_t$ | | t | $x_t$ | $y_t$ |
|---|---|---|---|---|---|---|
| 1 | so | O | | 12 | like | O |
| 2 | if | ,COMMA | | 13 | well | ?QMARK |
| 3 | we | O | | 14 | i | ,COMMA |
| 4 | make | O | | 15 | think | O |
| 5 | no | O | | 16 | you | O |
| 6 | changes | O | | 17 | probably | O |
| 7 | today | ,COMMA | | 18 | already | O |
| 8 | what | O | | 19 | have | O |
| 9 | does | O | | 20 | the | O |
| 10 | tomorrow | O | | 21 | picture | O |
| 11 | look | O | | 22 | </s> | .PERIOD |

| Models | COMMA | | | PERIOD | | | QUESTION | | | OVERALL | | | SER |
|---|---|---|---|---|---|---|---|---|---|---|---|---|---|
| | P | R | F | P | R | F | P | R | F | P | R | F | |
| DNN-A | 48.6 | 42.4 | 45.3 | 59.7 | 68.3 | 63.7 | - | - | - | 54.8 | 53.6 | 54.2 | 66.9 |
| CNN-2A | 48.1 | 44.5 | 46.2 | 57.6 | 69.0 | 62.8 | - | - | - | 53.4 | 55.0 | 54.2 | 68.0 |
| T-LSTM | 49.6 | 41.4 | 45.1 | 60.2 | 53.4 | 56.6 | 57.1 | 43.5 | 49.4 | 55.0 | 47.2 | 50.8 | 74.0 |
| T-BRNN | 64.4 | 45.2 | 53.1 | 72.3 | 71.5 | 71.9 | 67.5 | 58.7 | 62.8 | 68.9 | 58.1 | 63.1 | 51.3 |
| T-BRNN-pre | 65.5 | 47.1 | 54.8 | 73.3 | 72.5 | 72.9 | 70.7 | 63.0 | 66.7 | 70.0 | 59.7 | 64.4 | 49.7 |
| Single-BiRNN | 62.2 | 47.7 | 54.0 | 74.6 | 72.1 | 73.4 | 67.5 | 52.9 | 59.3 | 69.2 | 59.8 | 64.2 | 51.1 |
| Corr-BiRNN | 60.9 | 52.4 | 56.4 | 75.3 | 70.8 | 73.0 | 70.7 | 56.9 | 63.0 | 68.6 | 61.6 | 64.9 | 50.8 |
| DRNN-LWMA | 63.4 | 55.7 | 59.3 | 76.0 | 73.5 | 74.7 | 75.0 | 71.7 | 73.3 | 70.0 | 64.6 | 67.2 | 47.3 |
| DRNN-LWMA-pre | 62.9 | 60.8 | 61.9 | 77.3 | 73.7 | 75.5 | 69.6 | 69.6 | 69.6 | 69.9 | 67.2 | 68.6 | 46.1 |

*Fig. 7*

UTILIZING DEEP RECURRENT NEURAL NETWORKS WITH LAYER-WISE ATTENTION FOR PUNCTUATION RESTORATION

BACKGROUND

Recent years have seen significant advancements in hardware and software platforms that can perform various tasks based on speech. For example, many conventional systems can generate a transcript based on speech included in an audio recording and then process the transcript to perform additional tasks, such as generating a summary or a translation of the transcript. In many instances, however, the transcripts merely include a sequence of raw words with no punctuation. Indeed, in some instances, punctuation improves the understandability of the meaning of sentences included within a transcript, allowing for more effective task execution. Accordingly, many conventional systems further process unpunctuated transcripts to generate corresponding punctuated transcripts in a process referred to as punctuation restoration.

However, several problems and issues exist with regard to conventional punctuation restoration systems, which will be discussed in more detail below.

SUMMARY

One or more embodiments described herein provide benefits and/or solve one or more problems in the art with systems, methods, and non-transitory computer-readable media that utilize a deep recurrent neural network for accurately performing punctuation restoration. For example, in one or more embodiments, a system provides a sequence of words to a stacked neural network architecture having multiple bi-directional recurrent layers and one or more neural attention mechanisms. In one or more embodiments, the neural network architecture applies a neural attention mechanism to every bi-directional recurrent layer. In some embodiments, each neural attention mechanism includes a multi-head attention. In further embodiments, each neural attention mechanism includes a scaled dot-product attention. The system can utilize the neural network architecture to generate a set of probabilities for each word, indicating the likelihood that each possible punctuation mark is associated with that word. Based on these probabilities, the system can generate a punctuated transcript that includes punctuation before the appropriate words. In this manner, the disclosed systems can efficiently generate punctuated transcripts that accurately convey the meaning of the included text.

To illustrate, in one or more embodiments, the system generates, by each bi-directional recurrent neural network layer of a plurality of bi-directional recurrent neural network layers, a plurality of output states corresponding to words from a sequence of words. The system can then use one or more neural attention mechanisms to generate a plurality of attention outputs based on the output states. Using the plurality of attention outputs and the plurality of output states, the system can determine punctuation label probabilities for the words from the sequence of words. Subsequently, the system can generate a punctuated transcript that includes punctuation before one or more of the words based on the punctuation labels probabilities.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 3 illustrates a table representing execution of a sequence labelling task in accordance with one or more embodiments;

FIG. 7 illustrates a table reflecting additional experimental results regarding the effectiveness of the punctuation restoration system in accordance with one or more embodiments;

DETAILED DESCRIPTION

Figure 1:
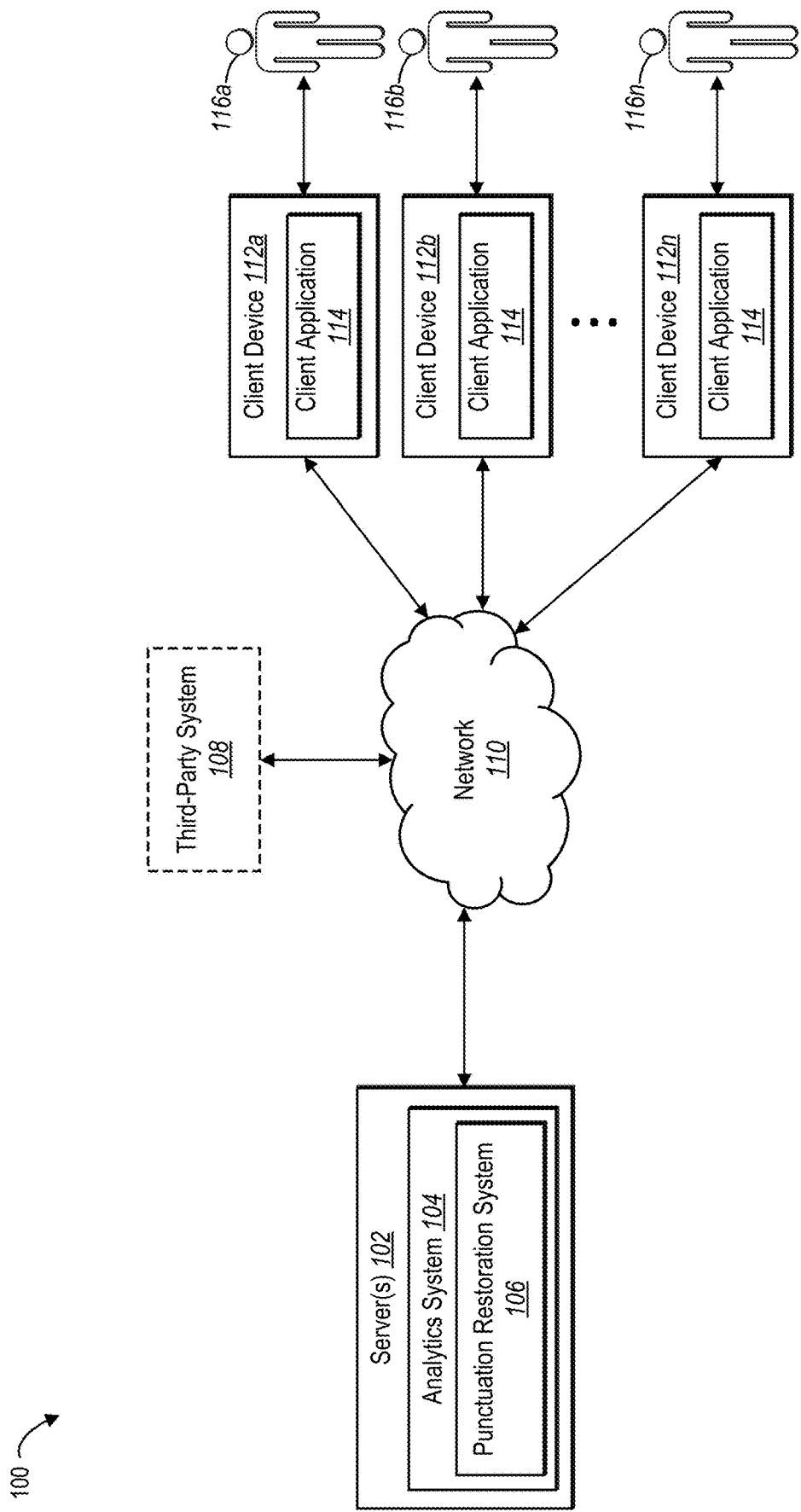
FIG. 1 illustrates an example environment in which a punctuation restoration system can operate in accordance with one or more embodiments.

One or more embodiments described herein include a punctuation restoration system that utilizes a deep recurrent neural network architecture that efficiently predicts punctuation that accurately conveys meaning within a transcript. For example, in one or more embodiments, a punctuation restoration system provides a sequence of words to a stacked neural network having multiple bi-directional recurrent layers and one or more neural attention mechanisms. In one or more embodiments, the neural network architecture incorporates layer-wise attentions (e.g., applies a neural attention mechanism to every bi-directional recurrent layer), multi-head attentions (e.g., each neural attention mechanism includes a multi-head attention), and/or scaled dot-product attentions. The system can utilize the neural network to generate probabilities for words that provide the likelihood that types of punctuation are associated with a given word. Based on these probabilities, the punctuation restoration system can generate a punctuated transcript that includes punctuation for the sequence of words.

To provide an example, in one or more embodiments, the punctuation restoration system utilizes bi-directional recurrent neural network layer of a plurality of bi-directional recurrent neural network layers to generate a plurality of output states corresponding to words from a sequence of words. The punctuation restoration system can then generate a plurality of attention outputs based on the output states using one or more neural attention mechanisms (e.g., a neural attention mechanism corresponding to each bi-directional recurrent neural network layer, multi-head neural attention mechanisms, scaled dot-product neural attention mechanisms). Using the attention outputs and the output states, the punctuation restoration system can determine punctuation label probabilities for the words from the sequence of words and then generate a punctuated transcript that includes punctuation before one or more of the words based on the punctuation labels probabilities.

As just mentioned, in one or more embodiments, the punctuation restoration system utilizes a neural network (i.e., a punctuation restoration neural network) having a plurality of bi-directional recurrent neural network layers for performing punctuation restoration for a sequence of words. For example, in one or more embodiments, a bi-directional recurrent neural network layer includes a forward recurrent neural network layer and a backward recurrent neural network layer. For a given bi-directional recurrent neural network layer, the punctuation restoration system can utilize the forward recurrent neural network layer to generate forward states corresponding to words from the sequence of words and the backward recurrent neural network layers to generate backward states corresponding to the words. The punctuation restoration neural network can then combine the forward states and backward states corresponding to the given states to generate the output states for the bi-directional recurrent neural network layer.

As further mentioned above, in one or more embodiments, the punctuation restoration neural network includes one or more neural attention mechanisms for generating a plurality of attention outputs based on the plurality of output states. To illustrate, in some embodiments, the punctuation restoration neural network includes a neural attention mechanism applied to the top (i.e., final) bi-directional recurrent neural network layer, which can include either a single-head or a multi-head neural attention mechanism. In other embodiments, the punctuation restoration neural network incorporates layer-wise attention, having a neural attention mechanism (either single-head or multi-head) applied to each bi-directional recurrent neural network layer. In one or more embodiments, each neural attention mechanism includes a scaled dot-product neural attention mechanism.

The punctuation restoration neural network can generate the plurality of attention outputs based on the various possible arrangements of neural attention mechanisms. For example, where incorporating layer-wise attentions, the punctuation restoration neural network can utilize a given neural attention mechanism to generate a layer-wise attention weight for each output state of the corresponding bi-directional recurrent neural network layer. The punctuation restoration neural network can then concatenate, for a given state (i.e., timestep corresponding to the processing of a particular word), the layer-wise attention weights corresponding to that state. As another example, where employing multi-head attention, the punctuation restoration neural network can utilize a multi-head neural attention mechanism to generate a plurality of attention weights for each state and concatenate, for each state, the plurality of attention weights corresponding to that state. As a further example, where incorporating layer-wise attentions and multi-head attention simultaneously, the punctuation restoration neural network can utilize a multi-head neural attention mechanism to generate a plurality of layer-wise attention weights for each output state of the corresponding bi-directional recurrent neural network layer. The punctuation restoration neural network can then concatenate, for each state, the plurality of layer-wise attention weights corresponding to that state.

As further mentioned above, in one or more embodiments, the punctuation restoration system utilizes the punctuation restoration neural network to determine punctuation label probabilities for the words in the sequence of words. In particular, the punctuation restoration neural network can utilize the outputs states generated by the bi-directional recurrent neural network layers and the attention outputs generated by the one or more neural attention mechanisms to determine the punctuation label probabilities. In one or more embodiments, the punctuation restoration neural network generates a punctuation label probability distribution for each word, indicating the probability that a punctuation mark corresponding to each available punctuation label is associated with that word. The punctuation restoration system can use the punctuation label probabilities to generate a punctuated transcript that includes the sequence of words and punctuation before one or more of the words.

As mentioned above, several problems and issues exist with regard to conventional punctuation restoration systems, often resulting in inefficient and inaccurate operation. For example, conventional punctuation restoration systems are often inefficient in that they employ computationally expensive models to predict the punctuation for a sequence of words. To illustrate, many conventional systems utilize neural networks having an additive neural attention mechanism to generate values (e.g., attention outputs) utilized in generating punctuation predictions. Additive neural attention mechanisms, however, require a significant amount of computing resources (e.g., computing time and memory) to generate the resulting values. Indeed, such inefficiency becomes especially problematic when predicting punctuation for large sequences of words.

In addition to efficiency concerns, conventional punctuation restoration systems are often inaccurate. In particular, many conventional punctuation restoration systems employ models that fail to analyze a sequence of words thoroughly. As an example, many conventional systems utilize neural networks (e.g., convolutional neural networks or recurrent neural networks) that are simple (e.g., shallow) in structure and fail to learn the entire context or fail to capture all features of a sequence of words. Consequently, the conventional systems often fail to identify the punctuation that accurately conveys the meaning of the sequence of words.

The punctuation restoration system provides several advantages over conventional systems. For example, the punctuation restoration system operates more efficiently than conventional systems. In particular, by utilizing a neural network architecture having scaled-dot product neural attention mechanisms, the punctuation restoration system can generate attention punctuation label probabilities more efficiently. Indeed, the punctuation restoration system reduces the amount of computing time and memory required to generate punctuation predictions.

Further, the punctuation restoration system improves accuracy. For example, by utilizing a deep neural network architecture having multiple bi-directional recurrent neural network layers, the punctuation restoration system can learn more hierarchical features of a sequence of words. By incorporating layer-wise attentions, the punctuation restoration system can capture layer-wise features related to the sequence of words directly. Further, by utilizing multi-head neural attention mechanisms (whether applied in a layer-wise fashion or applied to the top bi-directional recurrent neural network layer of the punctuation restoration neural network), the punctuation restoration system diversifies the attention applied when analyzing the sequence of words. Consequently, the punctuation restoration system can better learn the contexts and features associated with a sequence of words. The punctuation restoration system can then predict punctuation that more accurately conveys the meaning of the sequence of words (e.g., generate more accurate punctuated transcripts).

As illustrated by the foregoing discussion, the present disclosure utilizes a variety of terms to describe features and benefits of the punctuation restoration system. Additional detail is now provided regarding the meaning of these terms. For example, as used herein, the term "transcript" refers to a textual representation of a sequence of words. In particular, a transcript can refer to a raw (e.g., unpunctuated) textual representation of speech captured within audio content, where the text has been generated by a human or machine transcribing the audio content. For example, a transcript can include text corresponding to a meeting between two or more people or text corresponding to a dictation. Relatedly, as used herein, the term "punctuated transcript" refers to a transcript having punctuation associated with one or more words in the text.

Additionally, as used herein, the term "punctuation label probability" refers to a value indicating the probability of an event. In particular, a punctuation label probability can include a value indicating a probability that a punctuation mark corresponding to a punctuation label (i.e., punctuation category) is associated with a word. For example, a punctuation label probability can include a value indicating the probability that a comma, a period, or a question mark is associated with a word. In some embodiments, a punctuation label probability can refer to a value indicating a probability that no punctuation mark is associated with a particular word. A punctuation label probability can be included in a probability distribution having a separate punctuation label probability for each of a plurality of punctuation labels.

Further, as used herein, the term "punctuation restoration neural network" refers to a computer algorithm or model that generates punctuation label probabilities. In particular, a punctuation restoration neural network can refer to a computer algorithm that analyzes a transcript (i.e., an unpunctuated sequence of words) to predict which punctuation conveys the meaning of the included text. For example, the punctuation restoration neural network can refer to a neural network, such as a bi-directional recurrent neural network.

As used herein, the term "neural network" refers to a machine learning model that can be tuned (e.g., trained) based on inputs to approximate unknown functions. In particular, the term neural network can include a model of interconnected artificial neurons (e.g., organized in layers) that communicate and learn to approximate complex functions and generate outputs based on a plurality of inputs provided to the model. For instance, the term neural network includes one or more machine learning algorithms. In addition, a neural network can refer to an algorithm (or set of algorithms) that implements deep learning techniques that utilize a set of algorithms to model high-level abstractions in data.

Additionally, as used herein, the term "state" refers to a condition of a neural network while processing inputs at a specific point in time (i.e., at a particular time step). In particular, a state corresponds to a particular input to the neural network. For example, a state can correspond to a word from a sequence of words being processed by a punctuation restoration neural network. Thus, as an example, the first word in a sequence of words can correspond to state 1, a second word to state 2, etc.

Relatedly, as used herein, the term "output state" refers to an output generated by a hidden layer of a neural network. In particular, an output state can include a value or set of values generated by a bi-directional recurrent neural network layer of a punctuation restoration neural network. An output state can correspond to a particular state of the neural network. As used herein, the term "final state" more specifically refers to an output generated by a final layer of a neural network. In particular, a final state can refer to the final hidden state provided to an output layer to generate the output of the neural network.

Additionally, as used herein, the term "neural attention mechanism" refers to a neural network component that generates values corresponding to attention-controlled features. In particular, a neural attention mechanism can generate values based on one or more hidden states (e.g., an output state and/or a final state). For example, a neural attention mechanism can be trained to control access to memory, allowing certain features to be stored and later access while processing neural network inputs in order to learn the context of a given input (i.e., a given hidden state corresponding to the input) without relying solely on that input. In one or more embodiments, a neural attention mechanism corresponds to a particular neural network layer and processes the outputs (e.g., the output states) generated by the neural network layer.

Relatedly, as used herein, the term "multi-head neural attention mechanism" refers to a neural attention mechanism composed of multiple neural attentions. In particular, a multi-head neural attention mechanism can refer to set of multiple neural attentions applied to the same neural network layer (i.e., generates values based on the output states generated by the same neural network layer). Each neural attention included in the set of multiple neural attentions can be trained to capture different attention-controlled features or a different set of attention-controlled features that may or may not overlap. In contrast, a "single-head neural attention mechanism" refers to a neural attention mechanism composed of a single neural attention.

As used herein, the term "attention weight" refers to an output generated by a neural attention mechanism. In particular, an attention weight refers to a value or set of values generated by a single-head neural attention mechanism or by one of the neural attentions included in a multi-head neural attention mechanism. For example, an attention weight can include a single value, a vector of values, or a matrix of values. The term "layer-wise attention weight" refers, more specifically, to an output generated by a neural attention mechanism that is part of a neural network having a layer-wise attention architecture. The term "attention outputs" refers to the values generated by neural attention mechanisms as used by a neural network for further processing. In particular, attention outputs can be included in a matrix or vector that combines (e.g., concatenates) attention weights (or layer-wise attention weights) generated by the neural attention mechanisms.

Additionally, as used herein, the term "layer-wise attentions" refers to a neural network architecture having neural attention mechanisms applied to multiple neural network layers. For example, a neural network architecture incorporating layer-wise attentions can apply one or more neural attention mechanisms to every layer, to every hidden layer, or to a subset of hidden layers.

Additional detail regarding the punctuation restoration system will now be provided with reference to the figures. For example, FIG. 1 illustrates a schematic diagram of an exemplary system environment ("environment") 100 in which a punctuation restoration system 106 can be implemented. As illustrated in FIG. 1, the environment 100 can include a server(s) 102, a third-party system 108, a network 110, client devices 112a-112n, and users 116a-116n.

Although the environment 100 of FIG. 1 is depicted as having a particular number of components, the environment 100 can have any number of additional or alternative components (e.g., any number of servers, third-party systems, client devices, or other components in communication with the punctuation restoration system 106 via the network 110). Similarly, although FIG. 1 illustrates a particular arrangement of the server(s) 102, the third-party system 108, the network 110, the client devices 112a-112n, and the users 116a-116n, various additional arrangements are possible.

The server(s) 102, the third-party system 108, the network 110, and the client devices 112a-112n may be communicatively coupled with each other either directly or indirectly (e.g., through the network 110 discussed in greater detail below in relation to FIG. 10). Moreover, the server(s) 102, the third-party system 108, and the client devices 112a-112n may include a computing device (including one or more computing devices as discussed in greater detail with relation to FIG. 10).

As mentioned above, the environment 100 includes the server(s) 102. The server(s) 102 can generate, store, receive, and/or transmit data, including punctuated transcripts. For example, the server(s) 102 can receive a transcript from the third-party system 108 (or from one of the client devices 112a-112n) and transmit a punctuated transcript back to the third-party system 108 (or to one of the client devices 112a-112n). In one or more embodiments, the server(s) 102 comprises a data server. The server(s) 102 can also comprise a communication server or a web-hosting server.

As shown in FIG. 1, the server(s) 102 can include an analytics system 104. In particular, the analytics system 104 can collect, manage, and utilize analytics data. For example, the analytics system 104 can collect analytics data related to sequences of words (e.g., unpunctuated sequences of words), the context of the sequences of words, and punctuation that conveys meaning in light of the contexts. The analytics system 104 can collect the analytics data in a variety of ways. For example, in one or more embodiments, the analytics system 104 causes the server(s) 102 and/or the third-party system 108 to track data related to word sequences, meanings, contexts, and punctuation and report the tracked data for storage on a database. In one or more embodiments, the analytics system 104 receives the data directly from the client devices 112a-112n via data stored thereon.

Additionally, the server(s) 102 include the punctuation restoration system 106. In particular, in one or more embodiments, the punctuation restoration system 106 uses the server(s) 102 to generate punctuated transcripts corresponding to a transcript having a sequence of words. For example, the punctuation restoration system 106 can use the server(s) 102 to generate punctuation label probabilities for a sequence of words and generate a punctuated transcript based on the punctuation label probabilities.

For example, in one or more embodiments, the server(s) 102 can utilize a punctuation restoration neural network having a plurality of bi-directional recurrent neural network layers to generate distribution label probabilities for each word in a sequence of words. In particular, the server(s) 102 can use each bi-directional recurrent neural network layer to generate output states corresponding to the words. The server(s) 102 can further use one or more neural attention mechanisms to generate a plurality of attention outputs based on the output states. Subsequently, the server(s) 102 can generate the punctuation label probabilities based on the output states and the attention outputs and then generate a punctuated transcript having punctuation before one or more of the words based on the punctuation label probabilities.

In one or more embodiments, the third-party system 108 includes a third-party system for generating transcripts. For example, in some embodiments, the third-party system 108 receives audio content from a device (e.g., one of the client devices 112a-112n or a separate audio recording device) and generates a transcript corresponding to speech captured within the audio content. The third-party system 108 can include any system capable of transcribing the speech of audio content (e.g., an automatic speech recognition system). The third-party system 108 can transmit or provide access to generated transcripts to the punctuation restoration system 106 for generating punctuated transcripts. It should be noted, however, that in some embodiments, at least one of the client devices 112a-112n has functionality for transcribing audio content. In other embodiments, the punctuation restoration system 106 can generate the transcript based on the speech in the audio content.

In one or more embodiments, the client devices 112a-112n include computer devices that allow users of the devices (e.g., the users 116a-116n) to access and view transcripts, including punctuated transcripts. For example, the client devices 112a-112n can include smartphones, tablets, desktop computers, laptop computers, or other electronic devices. The client devices 112a-112n can include one or more applications (e.g., the client application 114) that allow the users 116a-116n to access and view transcripts. For example, the client application 114 can include a software application installed on the client devices 112a-112n. Additionally, or alternatively, the client application 114 can include a software application hosted on the server(s) 102, which may be accessed by the client devices 112a-112n through another application, such as a web browser.

The punctuation restoration system 106 can be implemented in whole, or in part, by the individual elements of the environment 100. Indeed, although FIG. 1 illustrates the punctuation restoration system 106 implemented with regards to the server(s) 102, different components of the punctuation restoration system 106 can be implemented in any of the components of the environment 100. In particular, part of, or all of, the punctuation restoration system 106 can be implemented by a client device. The components of the punctuation restoration system 106 will be discussed in more detail with regard to FIG. 8 below.

Figure 2:
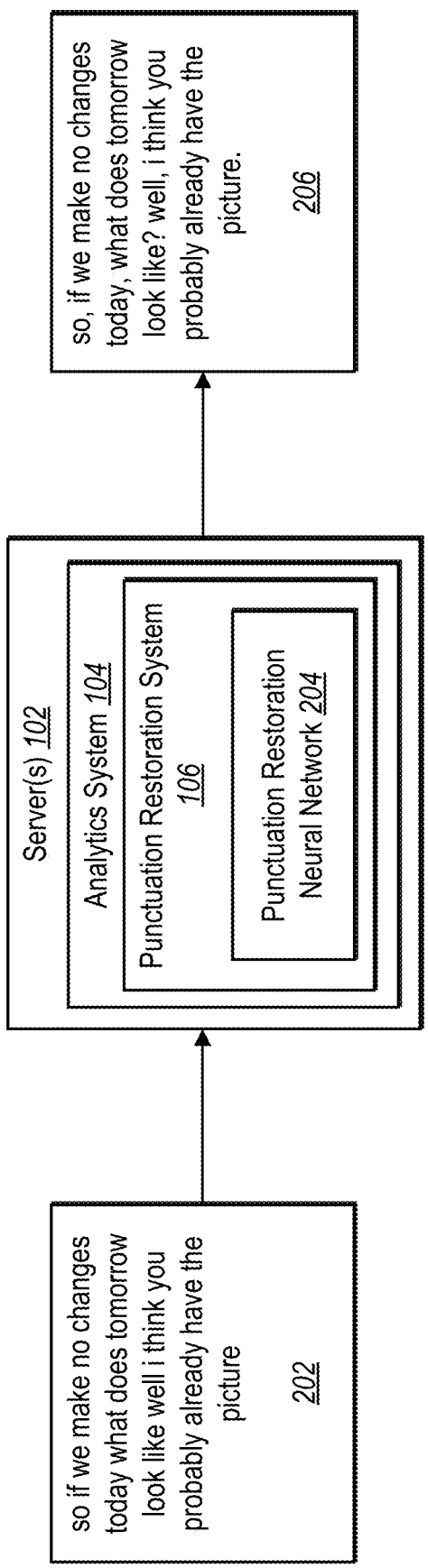
FIG. 2 illustrates a block diagram of a punctuation restoration system generating a punctuated transcript corresponding to a sequence of words in accordance with one or more embodiments.

As mentioned above, the punctuation restoration system 106 can generate punctuated transcripts. FIG. 2 illustrates a block diagram of the punctuation restoration system 106 generating a punctuated transcript 206 in accordance with one or more embodiments. As illustrated in FIG. 2, the punctuation restoration system 106 can identify a transcript 202 that includes a sequence of words. In one or more embodiments, the punctuation restoration system 106 identifies the transcript 202 by receiving the transcript 202 from an external source, such as the third-party system 108 or one of the client devices 112a-112n. In some embodiments, the punctuation restoration system 106 generates the transcript 202 directly based on speech captured within an audio recording.

As shown in FIG. 2, the transcript 202 can include a sequence of words having no punctuation. In other words, the transcript 202 can include raw text resulting directly from a transcription of recorded speech (i.e., without any further processing). It should be noted that in some embodiments, however, the transcript 202 can include some punctuation.

As illustrated in FIG. 2, the punctuation restoration system 106 can utilize a punctuation restoration neural network 204 to analyze the transcript 202. In one or more embodiments, the punctuation restoration neural network 204 includes a bi-direction recurrent neural network architecture having a plurality of bi-directional recurrent neural network layers. In some embodiments, the punctuation restoration neural network 204 further includes one or more neural attention mechanisms. Embodiments of the architecture of the punctuation restoration neural network 204 will be discussed in more detail below with reference to FIGS. 4A-4D.

As shown in FIG. 2, based on the analysis of the transcript 202 by the punctuation restoration neural network 204, the punctuation restoration system 106 can generate the punctuated transcript 206. In particular, the punctuation system 106 can determine which punctuation, if any, to associate with the words included in the transcript 202 based on the analysis by the punctuation restoration neural network 204. The punctuation restoration system 106 can then generate the punctuated transcript 206 based on this determination. As shown in FIG. 2, the punctuated transcript 206 can include the same sequence of words as the transcript 202; however, the punctuated transcript 206 can include punctuation inserted into the sequence of words.

Indeed, in one or more embodiments, the punctuation restoration system 106 defines the punctuation restoration problem as a sequence labelling task. FIG. 3 illustrates a table 300 representing execution of the sequence labelling task in accordance with one or more embodiments. In particular, the punctuation restoration system 106 can analyze a transcript using a punctuation restoration neural network to predict a punctuation label $y_t$ for the t-th timestep in a given sequence of words $X=\{x_1, \ldots, x_t, x_T\}$. The punctuation restoration system 106 can define the punctuation label $y_t$ using the following:

$$y_t = \begin{cases} c \in C & \text{if a punctuation mark } c \text{ is located} \\ & \text{between } x_{t-1} \text{ and } x_t \\ 0 & \text{otherwise} \end{cases} \quad (1)$$

In one or more embodiments, C as used in equation 1 represents a closed set of punctuation marks. For example, the set represented by C can include "comma," "period," and "question mark" exclusively. In other embodiments, however, the set represented by C can include any punctuation mark or any subset of punctuation marks.

As shown in FIG. 3, in one or more embodiments, the table 300 provides an exemplary structure in which the punctuation restoration system 106 associates a punctuation label $y_t$ with every word $x_t$ in the sequence of words X. In one or more embodiments, the punctuation restoration system 106 constructs a data structure corresponding to the table 300 within a memory location in order to track the associations between the punctuation labels and the words from the sequence of words X. The punctuation restoration system 106 can then refer to the data structure when generating the punctuated transcript.

As further shown in FIG. 3 and equation 1, in one or more embodiments, the punctuation restoration system 106 associates a punctuation label with a word that follows the corresponding punctuation mark. In other words, the punctuation restoration system 106 can use the punctuation restoration neural network to analyze a sequence of words and predict which punctuation, when inserted before a given word, correctly conveys the meaning of the sequence of words. Further, the punctuation restoration system 106 can predict where to insert punctuation indicating the end of a sentence (e.g., a period or question mark) even where the end of the sentence also marks the end of a sequence of words (i.e., no words follow the punctuation). For example, as shown in FIG. 3, the punctuation restoration system 106 can identify a token 302 that indicates the ending of the sequence of words. Consequently, the punctuation restoration system 106 can associate a punctuation label with the token 302 that marks the end of a sentence (i.e., insert the punctuation label before the token 302—or, in other words, behind the last word in the sequence of words). In some embodiments, however, the punctuation restoration system 106 associates punctuation labels with words that precede the punctuation labels.

As mentioned above, the punctuation restoration system 106 can utilize a punctuation restoration neural network to generate punctuation label probabilities for each word from a sequence of words. FIGS. 4A-4D each illustrate a schematic of a neural network architecture for a punctuation restoration neural network used by one or more embodiments of the punctuation restoration system 106 to generate punctuation label probabilities. As will be discussed below, the embodiments of the punctuation restoration neural network shown in FIGS. 4A-4D include variations of a bi-directional recurrent neural network architecture; however, these are merely provided as an example and should not be considered as limiting. In other embodiments, the punctuation restoration neural network can include other neural network architectures, some of which can include further variations of those shown in FIGS. 4A-4D.

Figure 4A:
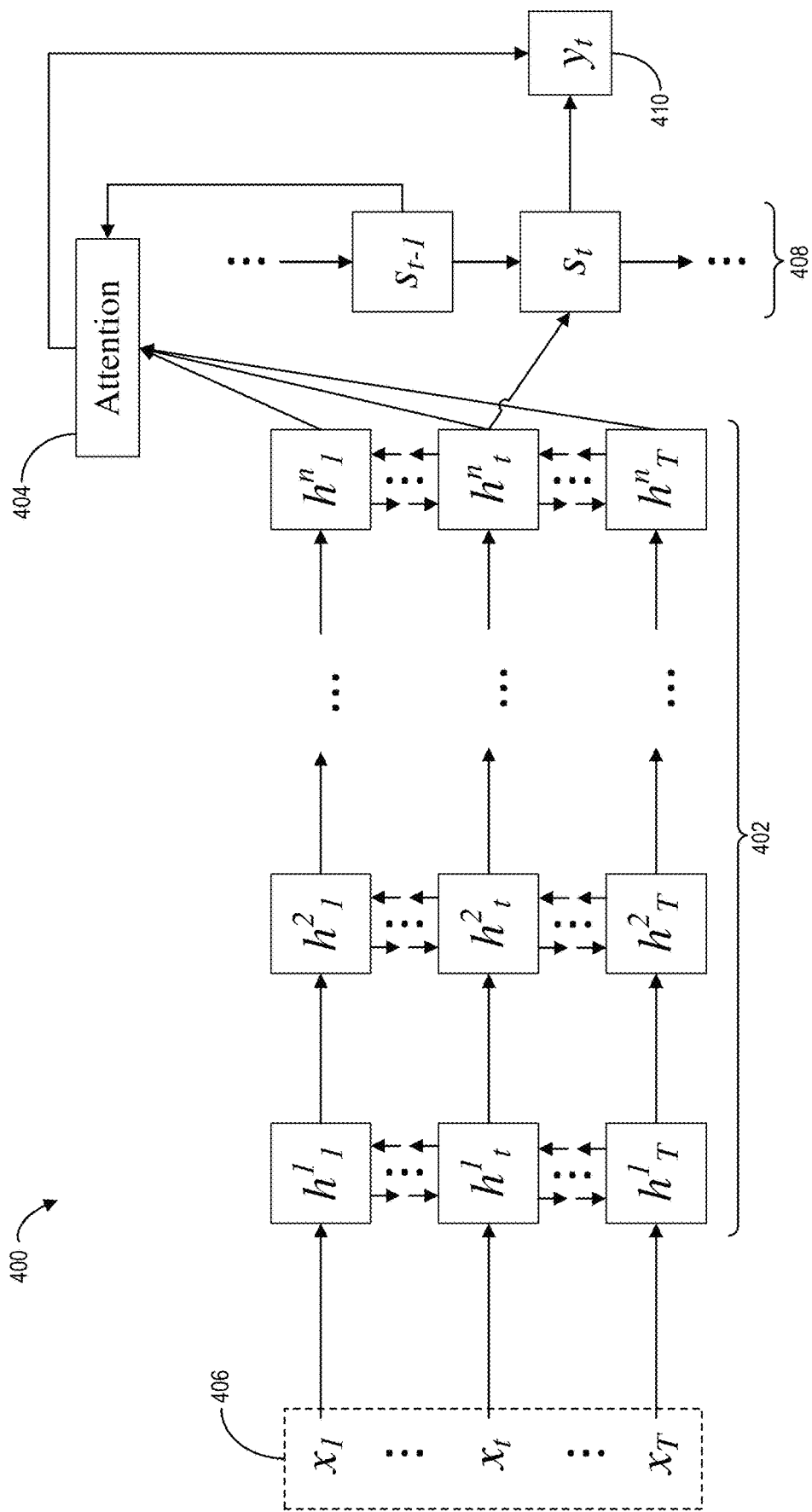
FIGS. 4A-4D each illustrate a schematic diagram of a punctuation restoration neural network in accordance with one or more embodiments.

FIG. 4A illustrates a punctuation restoration neural network 400 having a plurality of bi-directional recurrent neural network layers 402 and a neural attention mechanism 404 in accordance with one or more embodiments. In particular, each bi-directional neural network layer from the plurality of bi-directional neural network layers 402 can include a forward recurrent neural network layer and a backward recurrent neural network layer. Further, as shown in FIG. 4A, the neural attention mechanism 404 can be applied to the top (i.e., final) bi-directional recurrent neural network layer. As further shown, the neural attention mechanism 404 can include a single-head neural attention mechanism. In one or more embodiments, the neural attention mechanism 404 is included in a uni-directional recurrent neural network layer. In some embodiments, the neural attention mechanism 404 includes a scaled dot-product neural attention mechanism.

As shown in FIG. 4A, the punctuation restoration neural network 400 can receive a sequence of words $X=\{x_1, \ldots, x_t, \ldots, x_T\}$ as inputs 406. In particular, in one or more embodiments, the punctuation restoration neural network 400 receives, as the inputs 406, embeddings corresponding to each word. For example, the punctuation restoration system 106 can apply an embedding algorithm (e.g., a word-to-vector algorithm) to each word and provide the resulting embeddings to the punctuation restoration neural network 400 as the inputs 406. In some embodiments, the punctuation restoration neural network 400 includes a word embedding layer (e.g., as an input layer) that generates the embeddings for the sequence of words X.

After receiving the inputs 406, the punctuation restoration neural network 400 can use the plurality of bi-directional recurrent neural network layers 402 to process the inputs 406. In particular, the punctuation restoration neural network 400 can use each bi-directional recurrent neural network layer from the plurality of bi-directional recurrent neural network layers 402 to generate a plurality of output states corresponding to the inputs 406 (i.e., corresponding to the sequence of words). For example, the punctuation restoration neural network 400 can use the forward recurrent neural network layer of the first bi-directional recurrent neural network layer to process the embeddings of the sequence of words X in a forward direction to generate a plurality of forward states. The punctuation restoration neural network 400 can then use the backward recurrent neural network layer of the first bi-directional recurrent neural network layer to process the embeddings of the sequence of words X in a backward direction to generate a plurality of backward states. Then, for each state, the punctuation restoration neural network 400 can combine a forward state and a backward state corresponding to the state to generate the output state. The punctuation restoration neural network 400 can then use each subsequent bi-directional recurrent neural network layer to further process the inputs 406 by similarly processing the output states generated by the preceding bi-directional recurrent neural network layer.

In one or more embodiments, the punctuation restoration neural network 400 utilizes the output states generated by the top (i.e., final) bi-directional recurrent neural network layer to generate a set of final states. For example, the punctuation restoration neural network 400 can use a gated recurrent unit 408 to generate, for each state, a final state based on the output state that corresponds to that state and is output by the top bi-directional recurrent neural network layer. As shown in FIG. 4A, in some embodiments, the gated recurrent unit 408 generates the final state for a given state (i.e., the final state represented as $s_t$) further based on the final state corresponding to the previous state (i.e., the final state represented as $s_{t-1}$).

As further shown in FIG. 4A, the punctuation restoration neural network 400 can use the neural attention mechanism 404 to further process the inputs 406. In particular, the punctuation restoration neural network 400 can use the neural attention mechanism 404 to generate a plurality of attention outputs based on the plurality of output states. More specifically, as shown, the neural attention mechanism 404 can generate the attention outputs based on the output states generated by the top bi-directional recurrent neural network layer. In one or more embodiments, the neural attention mechanism 404 generates the plurality of attention outputs by generating a plurality of attention weights, where each attention weight corresponds to a particular state and is generated based on the corresponding output state generated by the top bi-directional recurrent neural network layer. As shown in FIG. 4A, in one or more embodiments, the neural attention mechanism 404 can generate an attention weight for a given state further based on the final state corresponding to the previous state (i.e., the previous state represented as $s_{t-1}$).

As can be seen in FIG. 4A, the punctuation restoration neural network 400 can use an output layer 410 to generate neural network outputs based on the attention outputs and the set of final states. In particular, the punctuation restoration neural network 400 can use the output layer 410 to generate a neural network output for a given state (i.e., the neural network output represented as $y_t$) based on the attention output and the final state corresponding to that state (i.e., the final state being $s_t$). In one or more embodiments, the output layer 410 includes a fully connected layer with a SoftMax classifier.

In one or more embodiments, the neural network output generated for a given state corresponds to the word associated with that state (i.e., the neural network output $y_t$ corresponds to the word $x_t$). Moreover, in some embodiments, the neural network output generated by the output layer 410 provides a prediction regarding which punctuation label, if any, conveys the meaning of the sequence of words X when associated with the word corresponding to the state. For example, the prediction can include punctuation label probabilities (e.g., in a probability distribution) for each state that indicates the probability that associating each available punctuation label with the corresponding word will convey the meaning of the sequence of words X.

By using a stacked neural network architecture having multiple bi-directional recurrent layers, the punctuation restoration neural network 400 can learn more hierarchical aspects of a sequence of words and can more accurately predict the punctuation labels that will convey the meaning of the sequence of words. Consequently, the punctuation restoration system 106 can generate more accurate punctuated transcripts. Further, by using scaled dot-product neural attention mechanisms, the punctuation restoration neural network 400 operates more efficiently than conventional systems. Indeed, the punctuation restoration neural network 400 can generate neural network outputs with improved speed.

Figure 4B:
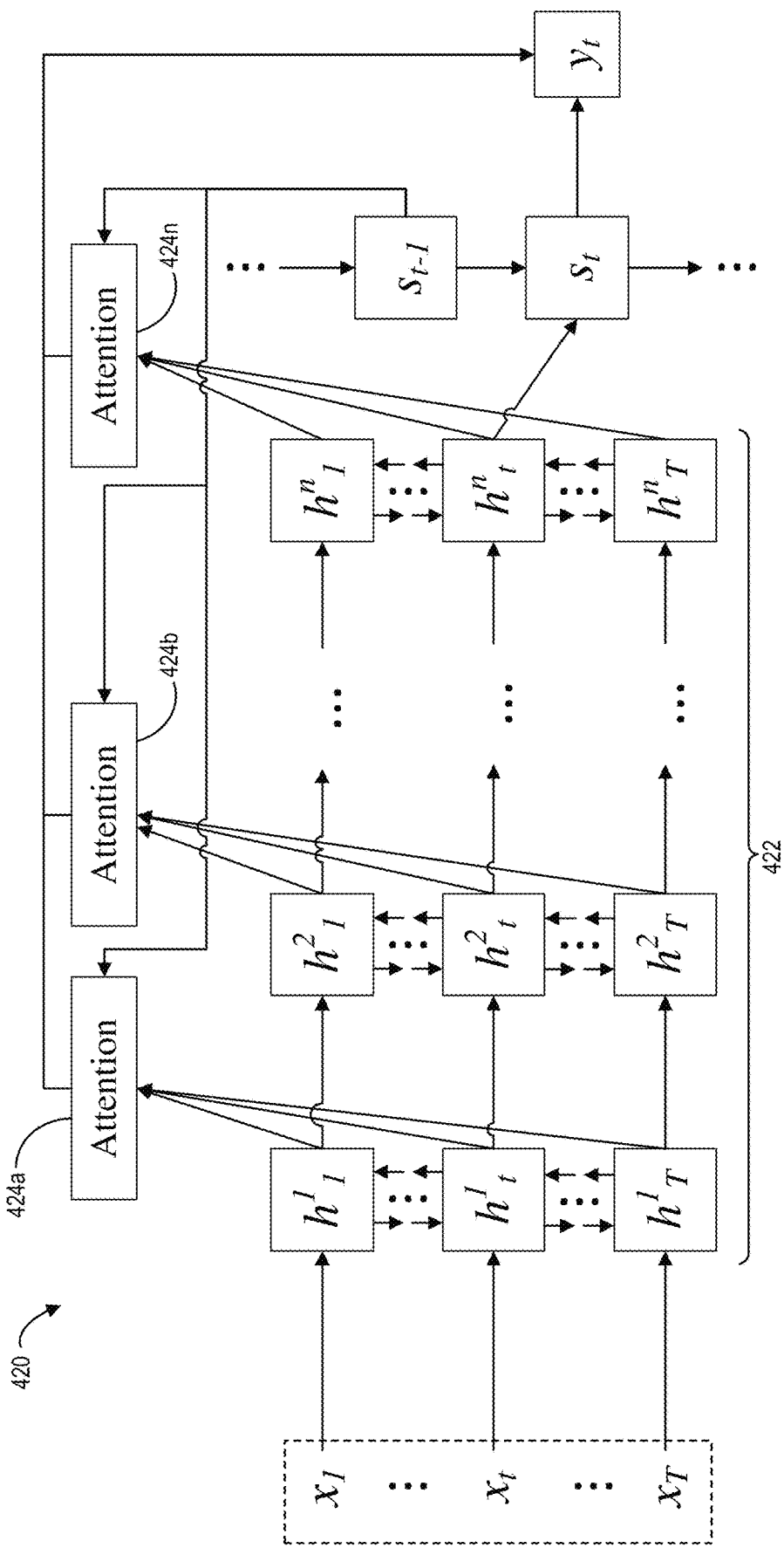

FIG. 4B illustrates a punctuation restoration neural network 420 having a plurality of bi-directional recurrent neural network layers 422 and a plurality of neural attention mechanisms 424a-424n in accordance with one or more embodiments. As can be seen in FIG. 4B, the punctuation restoration neural network 420 can use a neural network architecture that is similar to the punctuation restoration neural network 400 of FIG. 4A, except that the punctuation restoration neural network 420 incorporates layer-wise attentions. In particular, the punctuation restoration neural network 420 can include a neural attention mechanism for each bi-directional recurrent neural network layer. As further shown in FIG. 4B, each of the neural attention mechanisms 424a-424n can include a single-head neural attention mechanism. In some embodiments, one or more of the neural attention mechanisms 424a-424n includes a scaled dot-product neural attention mechanism.

In one or more embodiments, the punctuation restoration neural network 420 operates similarly to the punctuation restoration neural network 400 of FIG. 4A. However, in some embodiments, the punctuation restoration neural network 420 can generate the plurality of attention outputs—used for determining the neural network output—using each of the neural attention mechanisms 424a-424n. For example, the punctuation restoration neural network 420 can utilize each neural attention mechanism to generate a layer-wise attention weight for each output state generated by the corresponding bi-directional recurrent neural network layer. Then, for each state, the punctuation restoration neural network 420 can combine (e.g., concatenate) the layer-wise attention weights corresponding to that state to generate the attention outputs. Therefore, the punctuation restoration neural network 420 can generate a neural network output corresponding to a word using the plurality of neural attentions mechanisms 424a-424n having a layer-wise application.

By using a neural network architecture incorporating layer-wise attentions, the punctuation restoration neural network 420 can capture layer-wise features corresponding to a sequence of words directly. Consequently, the punctuation restoration neural network 420 can predict the punctuation labels that will convey the meaning of the sequence of words with improved accuracy when compared to conventional systems. Thus, the punctuation restoration system 106 can generate more accurate punctuated transcripts.

Figure 4C:
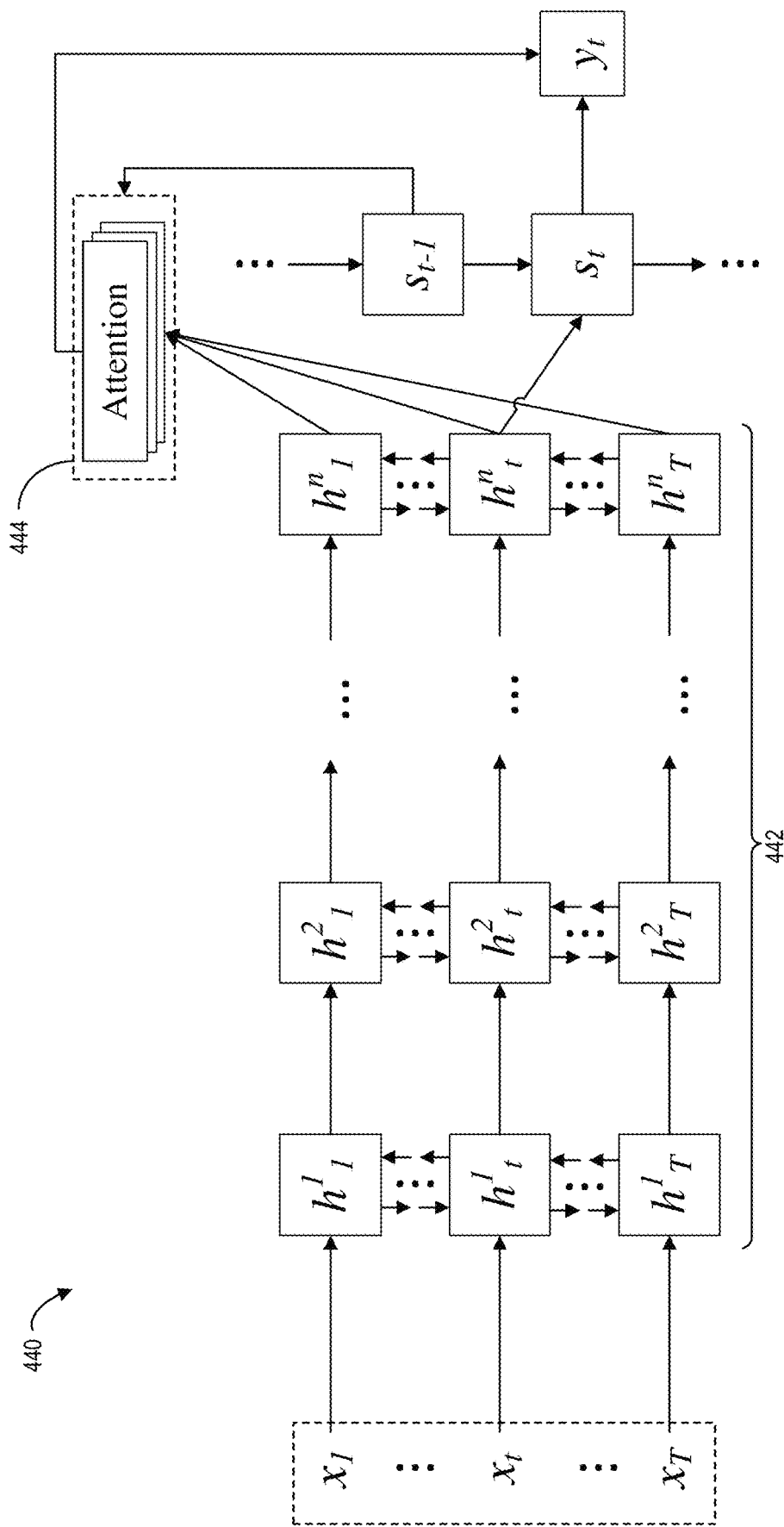

FIG. 4C illustrates a punctuation restoration neural network 440 having a plurality of bi-directional recurrent neural network layers 442 and a neural attention mechanism 444 in accordance with one or more embodiments. As can be seen in FIG. 4C, the punctuation restoration neural network 440 uses a neural network architecture that is similar to the punctuation restoration neural network 400 of FIG. 4A, except that the punctuation restoration neural network 440 can incorporate multi-head attention. In particular, the neural attention mechanism 444 can include a multi-head neural attention mechanism. In one or more embodiments, the neural attention mechanism 444 includes a scaled dot-product neural attention mechanism (e.g., one or more neural attentions of the multi-head neural attention mechanism applies a scaled dot-product attention).

In one or more embodiments, the punctuation restoration neural network 440 operates similarly to the punctuation restoration neural network 400 FIG. 4A. However, the punctuation restoration neural network 440 can generate the plurality of attention outputs-used for determining the neural network output-using the multi-head neural attention mechanism. For example, the punctuation restoration neural network 440 can utilize the multi-head neural attention mechanism to generate a plurality of attention weights for each state. Then, for each state, the punctuation restoration neural network 440 can combine (e.g., concatenate) the plurality of attention weights corresponding to that state to generate the attention outputs. Thus, the punctuation restoration neural network 440 can generate a neural network output corresponding to a word using a multi-head neural attention mechanism.

By using a neural network architecture that incorporates multi-head attention, the punctuation restoration neural network 440 can diversify the features captured by the neural attention mechanism 444. Consequently, the punctuation restoration neural network 440 can generate more accurate predictions when compared to conventional systems, allowing the punctuation restoration system 106 to generate more accurate punctuated transcripts.

Figure 4D:
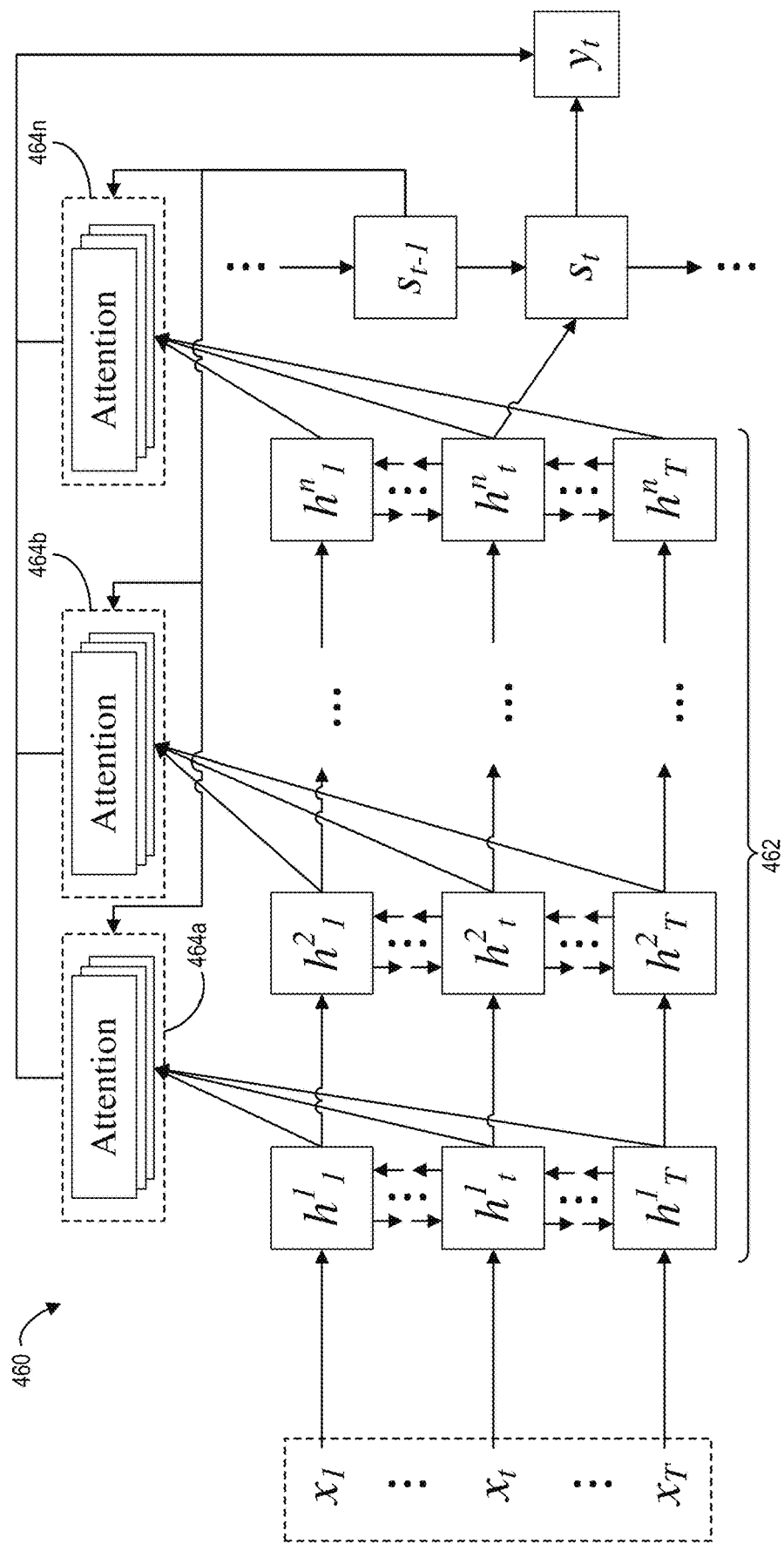

FIG. 4D illustrates a punctuation restoration neural network 460 having a plurality of bi-directional recurrent neural network layers 462 and a plurality of neural attention mechanisms 464a-464n in accordance with one or more embodiments. As can be seen in FIG. 4D, the punctuation restoration neural network 460 can use a neural network architecture that is similar to the punctuation restoration neural network 400 of FIG. 4A, except that the punctuation restoration neural network 460 incorporates both layer-wise attentions and multi-head attention. In particular, the punctuation restoration neural network 460 can include a neural attention mechanism for each bi-directional recurrent neural network layer. As further shown in FIG. 4D, each of the neural attention mechanisms 464a-464n can include a multi-head neural attention mechanism. In some embodiments, one or more of the neural attention mechanisms 464a-464n include a scaled dot-product neural attention mechanism.

In one or more embodiments, the punctuation restoration neural network 420 can generate the plurality of attention outputs-used for determining the neural network output-using each multi-head neural attention mechanism of the neural attention mechanisms 464a-464n. For example, the punctuation restoration neural network 460 can utilize each multi-head neural attention mechanism to generate a plurality of layer-wise attention weights for each output state generated by the corresponding bi-directional recurrent neural network layer. Then, for each state, the punctuation restoration neural network 460 can combine (e.g., concatenate) the layer-wise attention weights corresponding to that state to generate the attention outputs. Therefore, the punctuation restoration neural network 460 can generate a neural network output corresponding to a word using multi-head neural attention mechanisms having a layer-wise application. By using a neural network architecture that incorporates both layer-wise attentions and multi-head attention, the punctuation restoration neural network 460 can provide the benefits of the improved accuracy described above. Thus, the punctuation restoration system 106 can generate more accurate punctuated transcripts.

In one or more embodiments, the punctuation restoration system 106 trains a punctuation restoration neural network (e.g., one of the punctuation restoration neural networks 400, 420, 440, or 460) to generate punctuation label probabilities. For example, the punctuation restoration system 106 can provide training word sequences to the punctuation restoration neural network for analysis. The training word sequences can include unpunctuated sequences of words. The punctuation restoration system 106 can utilize the punctuation restoration neural network to generate punctuation label probabilities for each word in the training word sequences. The punctuation restoration system can then compare the generated punctuation label probabilities with a ground truth (i.e., a document—such as a pre-punctuated transcript—that shows where punctuation should be included) using a loss function and back propagate the loss (e.g., using an Adam optimizer) to update the parameters of the neural network. The punctuation restoration system 106 can then use the trained punctuation restoration neural network to analyze a sequence of words and generate punctuation label probabilities for the words of a sequence of words.

More detail regarding use of a punctuation restoration neural network will now be provided. In one or more embodiments, the punctuation restoration system 106 provides embedded word vectors to a punctuation restoration neural network having a plurality of bi-directional recurrent neural network layers (e.g., one of the punctuation restoration neural networks 400, 420, 440, or 460). The punctuation restoration neural network can then utilize gated recurrent units (hereinafter referred to as "GRUs") to generate the output states for each of the bi-directional recurrent neural network layers. For example, the punctuation restoration neural network can utilize the following to obtain the forward state from each forward recurrent neural network layer:

$$\vec{h}_t^i = \begin{cases} GRU\left(x_t, \vec{h}_{t-1}^1\right) & \text{if } i = 1 \\ GRU\left(h_t^{i-1}, \vec{h}_{t-1}^i\right) & \text{if } i = 2, \ldots n \end{cases} \quad (2)$$

Using equation 2, $\overrightarrow{h_t^i}$ represents the forward state from the beginning of the sequence to the t-th time step on the i-th recurrent layer, and n is the total number of bi-directional recurrent neural network layers. The punctuation restoration neural network can similarly calculate the backward state $$\overleftarrow{h_t^i}$$

using the reverse order from the end of the sequence T to t. The punctuation restoration neural network can then concatenate the directional states (i.e., the forward state and the backward state) into the output state:

$$\overline{h}_t^i = \left[\overrightarrow{h_t^i}, \overleftarrow{h_t^i}\right] \quad (3)$$

The punctuation restoration neural network can use the output states generated by the top bi-directional recurrent neural network layer (i.e., $[h_1^i, \ldots, h_T^i]$) to generate a set of final states. In particular, the punctuation restoration neural network can generate, for a given state, a final state based on the output state corresponding to that state and the final state corresponding to the previous state using a GRU as follows:

$$s_t = \text{GRU}(h_t^n, s_{t-1}) \quad (4)$$

In equation 4, the final state, $s_t$, can represent the temporal state at each time step. In one or more embodiments, $s_t$ constitutes a query to neural attentions. For example, as shown in FIGS. 4A-4D, the final state $s_t$ is used in generating the attention outputs for the subsequent state.

The punctuation restoration neural network can further forward the output states $[h_1^i, \ldots, h_T^i]$ of each bi-directional recurrent neural network layer having a corresponding neural attention mechanism to that neural attention mechanism. For example, where the punctuation restoration neural network applies a neural attention mechanism only to the top bi-directional recurrent neural network layer (e.g., the punctuation restoration neural network 400 of FIG. 4A and the punctuation restoration neural network 440 of FIG. 4C), the punctuation restoration neural network can forward the top-layer output states $[h_1^n, \ldots, h_T^n]$ to the neural attention mechanism corresponding to that layer. However, where the punctuation restoration neural network utilizes layer-wise attentions (e.g., the punctuation restoration neural network 420 of FIG. 4B and the punctuation restoration neural network 460 of FIG. 4D), the punctuation restoration neural network can forward the output states of each bi-directional recurrent neural network layer to the neural attention mechanism corresponding to that layer.

As mentioned, in one or more embodiments, the punctuation restoration neural network utilizes a scaled dot-product neural attention mechanism as follows:

$$\text{Attn}(Q, K, V) = \text{softmax}\left(\frac{QK^T}{\sqrt{d}}\right)V \quad (5)$$

In equation 5, the values Q, K, and V represent a set of queries, keys, and values, respectively, packed into a matrix. The value d represents the dimension of each of the queries and keys. In one or more embodiment, the attention mecha-nisms incorporates features as described by A. Vaswani et al., *Attention is All You Need,* 31st Conference on Neural Information Processing Systems, 2017, https://arxiv.org/abs/1706.03762, which is incorporated herein by reference in its entirety.

As further mentioned, in one or more embodiments, the punctuation restoration neural network applies multi-head neural attention mechanisms to each bi-directional recurrent neural network layer to generate pluralities of layer-wise attention weights from different representation subspaces, as follows where $S=[s_1; s_2; \ldots; s_T]$ and $H^i=[h_1^i; h_2^i; \ldots; h_T^i]$:

$$f_t^{i,j} = \text{Attn}((S \cdot W_Q^{i,j}), (H^i \cdot W_K^{i,j}), (H^i \cdot W_V^{i,j})) \quad (6)$$

The punctuation restoration neural network can then concatenate the pluralities of layer-wise attention weights $f_t^{i,j}$ for all $i \in \{1, \ldots, n\}$ and $j \in \{1, \ldots, m\}$—where n represents the number of bi-directional recurrent neural network layers and m represents the number of neural attentions in each multi-head neural attention mechanism—to generate the attention outputs. The punctuation restoration neural network can then further concatenate the attention outputs with the final layer $s_t$ and provide the resulting values to a fully-connected layer with a Softmax classifier, which generates a probabilistic distribution over the available punctuation labels as follows:

$$y_t = \text{softmax}([s_t, f_t^{1,1}, \ldots, f_t^{n,m}]W_y + b_y) \quad (7)$$

In both equations 6 and 7, the value W represents parameters learned while training the punctuation restoration neural network. The value b of equation 7 also represents learned parameters.

Thus, the punctuation restoration system 106 can utilize a punctuation restoration neural network to generate punctuation label probabilities for a sequence of words. The algorithms and acts described with reference to FIGS. 4A-4D can comprise the corresponding structure for performing a step for generating punctuation label probabilities for the sequence of words based on a transcript. Additionally, the punctuation restoration neural network architectures described with reference to FIGS. 4A-4D can comprise the corresponding structure for performing a step for generating punctuation label probabilities for the sequence of words based on a transcript.

Figure 5:
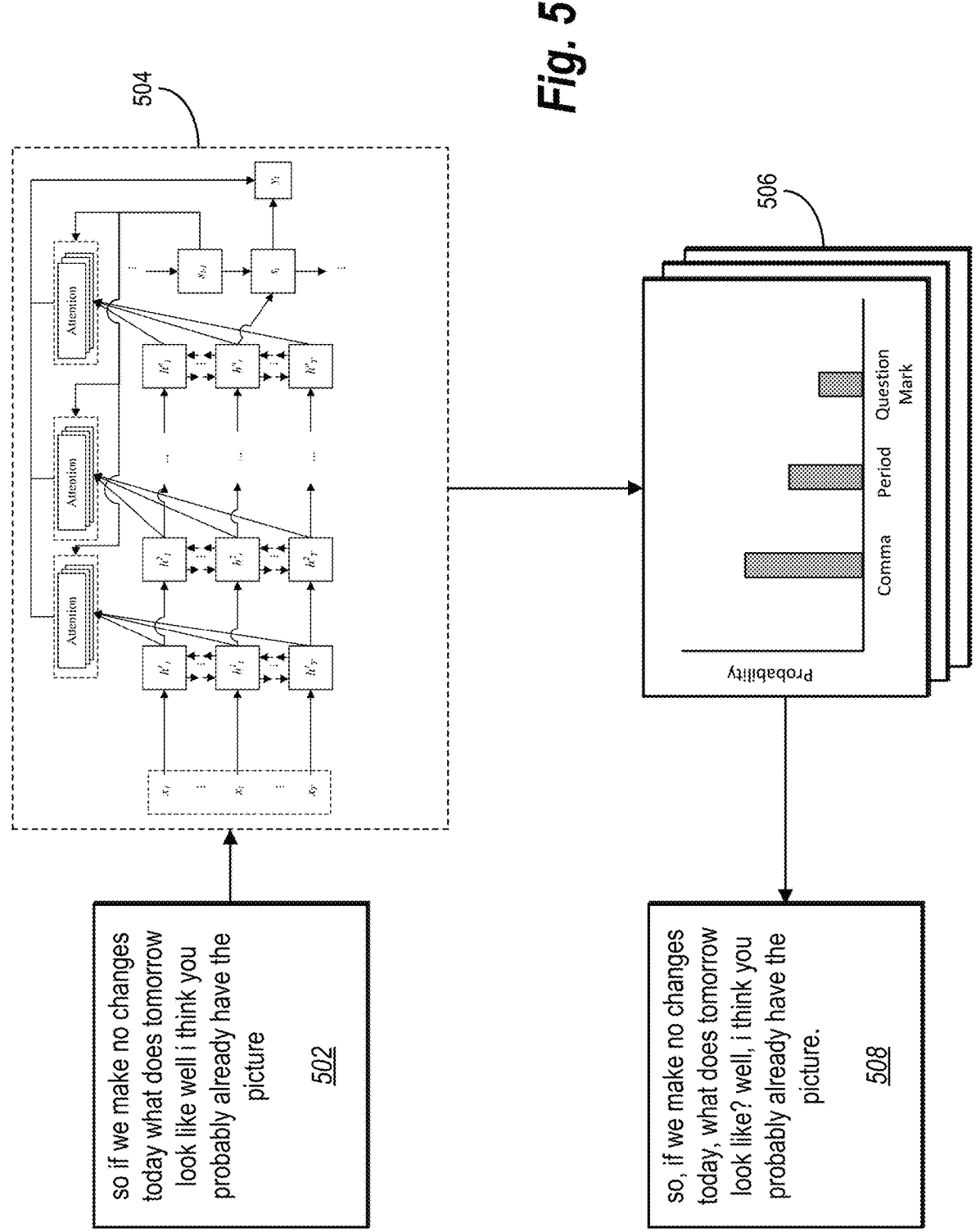
FIG. 5 illustrates a block diagram of generating a punctuated transcript in accordance with one or more embodiments.

As mentioned above, the punctuation restoration system 106 can use the neural network output generated by the punctuation restoration neural network to generate a punctuated transcript. FIG. 5 illustrates a block diagram of generating a punctuated transcript in accordance with one or more embodiments.

As shown in FIG. 5, the punctuation restoration system 106 can provide a transcript 502 having an unpunctuated sequence of words to a punctuation restoration neural network 504. Though the punctuation restoration neural network 504 of FIG. 5 corresponds to the punctuation restoration neural network 460 of FIG. 4D, it should be noted that the punctuation restoration neural network 504 can include a neural network architecture similar to any of those previously discussed with reference to FIGS. 4A-4D. In some embodiments, the punctuation restoration neural network 504 includes a further variation of one of the neural network architectures discussed with reference to FIGS. 4A-4D (e.g., applies multi-head neural attention mechanisms to some bi-directional recurrent neural network layers and single-head neural attention mechanisms to other layers).

The punctuation restoration system 106 can use the punctuation restoration neural network 504 to generate a plurality of neural network outputs 506. As previously mentioned, the neural network outputs 506 can include punctuation label probabilities. In particular, as shown in FIG. 5, the neural network outputs 506 can include a punctuation label probability distribution for each word from the sequence of words analyzed by the punctuation restoration neural network 504. Each punctuation label probability distribution can include a probability for each available punctuation label, indicating which punctuation label, when associated with a particular word, conveys the meaning of the sequence of words.

As shown in FIG. 5, the punctuation restoration system 106 can then generate a punctuated transcript 508 based on the punctuation label probabilities. Specifically, the punctuation restoration system 106 can associate punctuation labels with one or more words of the sequence of words from the transcript 502 and then generate the punctuated transcript 508 based on those associations. In one or more embodiments, the punctuation restoration system 106 associates a word with the punctuation label having the highest probability indicated by the corresponding punctuation probability distribution. In some embodiments, the punctuation restoration system 106 sets a probability threshold and does not associate any punctuation label with a word if none of the punctuation labels has a probability satisfying the threshold. In further embodiments, the punctuation label probability distributions can include a separate punctuation label probability that indicates the probability that none of the available punctuation labels are associated with that word. Though FIG. 5 shows the punctuation label probability distributions including punctuation label probabilities for "comma," "period," and "question mark," the punctuation label probability distributions can include probabilities for any other possible punctuation label.

As shown in FIG. 5, the punctuated transcript 508 includes punctuation marks inserted throughout the sequence of words. In particular, the punctuation restoration system 106 inserts punctuation marks before one or more words associated with the corresponding punctuation label based on the punctuation label probabilities.

In one or more embodiments, the punctuation restoration system 106 utilizes the punctuated transcript 508 to perform a task. Specifically, the punctuation restoration system 106 can perform a task that requires understanding of the meaning of punctuated text included in the punctuated transcript 508 (i.e., a language understanding task). For example, the punctuation restoration system 106 can use the punctuated transcript 508 to generate a translation of the punctuated transcript 508, generate a transcript summary, determine an answer to a question using the punctuated transcript 508, perform sentiment analysis or syntactic parsing based on the punctuated transcript 508, or extract information from the punctuated transcript 508.

Figure 6:
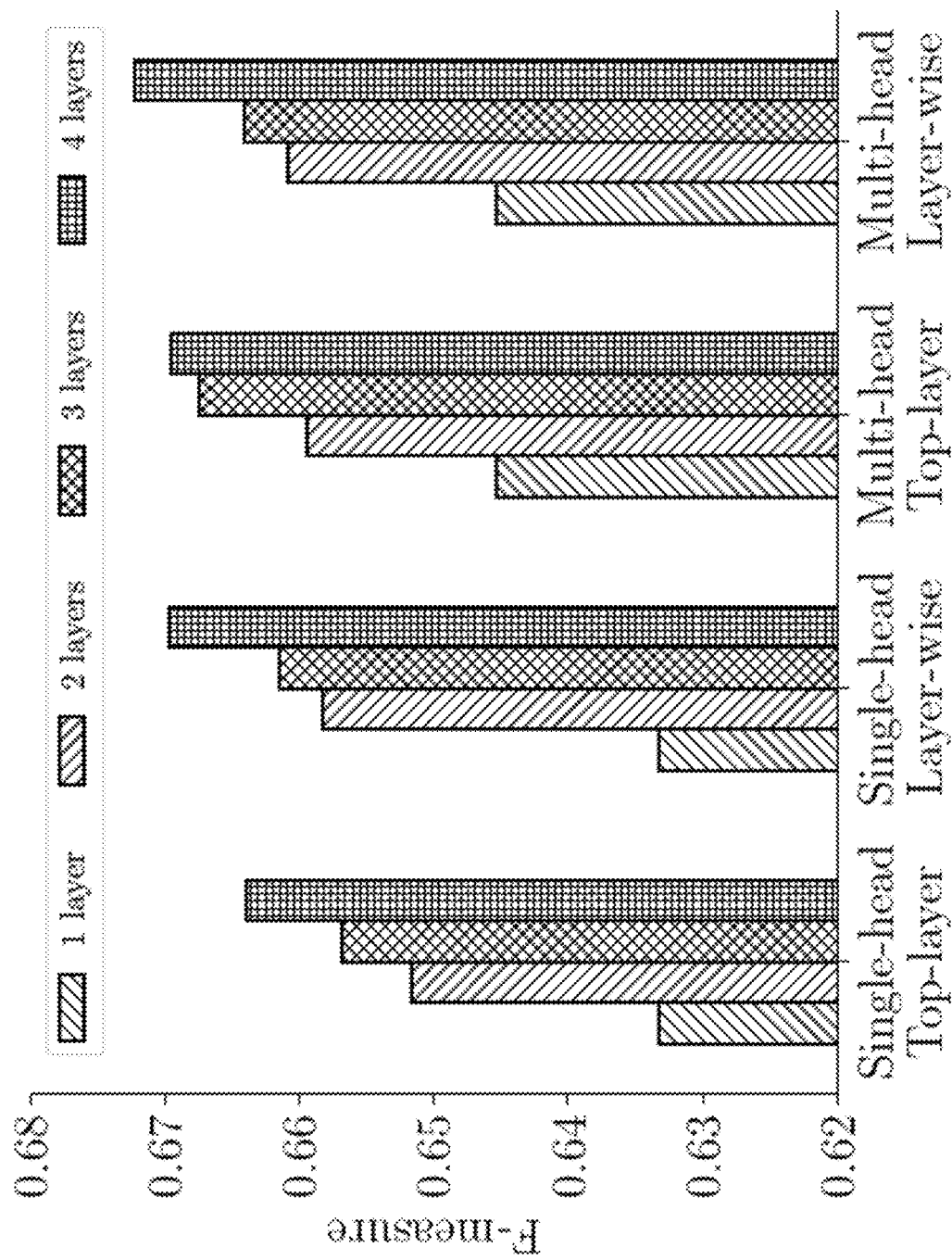
FIG. 6 illustrates a graph reflecting experimental results regarding the effectiveness of the punctuation restoration system in accordance with one or more embodiments.

As mentioned above, utilizing a punctuation restoration neural network trained to generate punctuation label probabilities for a sequence of words allows the punctuation restoration system 106 to more accurately determine which punctuation conveys the meaning of a sequence of words. Researchers have conducted studies to determine the accuracy of one or more embodiments of the punctuation restoration neural network used by the punctuation restoration system 106. FIGS. 6-7 each illustrate experimental results based on comparing the performance of one or more embodiments of the punctuation restoration neural network with the performance of one or more other models typically used by conventional systems.

The research evaluated several punctuation restoration neural network models having various combinations of the different parameters and network configurations (i.e., numbers of bi-directional recurrent neural network layers, numbers of attention heads per multi-head neural attention mechanism, and whether the neural attention mechanisms were incorporated layer-wise or only on the top bi-directional recurrent neural network layer). The researchers trained each model using Adam optimizer to minimize the negative log likelihood loss generated by the model. Further, the models were trained based on the IWSLT dataset, which includes English reference transcripts of TED talks. The research used the same partitioning of the dataset to conduct the experiment on each model, using about 2.1 million, 296 thousand, and 13 thousand words for training, development, and testing, respectively.

FIG. 6 illustrates a bar graph providing F-measure scores for a baseline model as well as various punctuation restoration neural network models. In particular, the model having one bi-directional recurrent neural network layer and a single-head neural attention mechanism (i.e., the baseline model) is similar to the T-BRNN model. As shown in FIG. 6, the baseline model achieved an F-measure score of 0.633 (close to the 0.631 score achieved by the T-BRNN model).

The remaining models reflected in FIG. 6 shows various configurations of the punctuation restoration neural network in accordance with one or more embodiments. As shown in FIG. 6, the punctuation restoration neural network models achieved an improved F-measure as the number of bi-directional recurrent neural network layers increased. For each punctuation restoration neural network having the same number of bi-directional recurrent neural network layers, the punctuation restoration neural network models incorporating layer-wise attentions generally performed better as well. Further, those punctuation restoration neural network models incorporating multi-head neural attention mechanisms achieved better F-measure scores than those models incorporating only single-head neural attention mechanisms. In particular, the punctuation restoration neural network model having four bi-directional recurrent neural network layers and a multi-head neural attention mechanism (three neural attentions) applied to each bi-direction recurrent neural network layer achieved an F-measure score of 0.672, a 3.9% improvement over the baseline model and a 4.1% improvement over the performance of the T-BRNN model.

FIG. 7 illustrates a table reflecting results of a similar study. The table in FIG. 7 compares the performance of two punctuation restoration neural network models incorporating layer-wise and multi-head attentions (i.e., the DRNN-LWMA and DRNN-LWMA-pre models) with many other models typically used by conventional systems. In particular, the models labeled with the suffix "pre" used pre-trained word vectors in generating the embeddings of the word sequences (e.g., initializing the word embedding layer of the model) compared to the random initialization of the other models. Higher precision (P), recall (R), and F-measure (F) scores indicate better punctuation predictions, while lower slot error rate (SER) also indicates better performance. The scores shown in FIG. 7 show the performance results on a per-punctuation basis, as well as overall.

As shown in FIG. 7, the punctuation restoration neural network used in one or more embodiments of the punctuation restoration system 106 outperformed the models of the conventional systems for almost every punctuation type and every metric. Notably, the results show that the DRNN-LWMA model outperformed the Corr-BiRNN model—a model based on bi-directional RNNs jointly trained on punctuation and capitalization—by 3.7% in F-measure and 4.7% in SER. Additionally, the results show that the DRNN- LWMA-pre model achieved 4.2% and 3.6% better performance in F-measure and SER, respectively, than the TBRNN-pre model. Thus, the punctuation restoration neural network used by the punctuation restoration system 106 operates more accurately than the models typically used by conventional systems.

Figure 8:
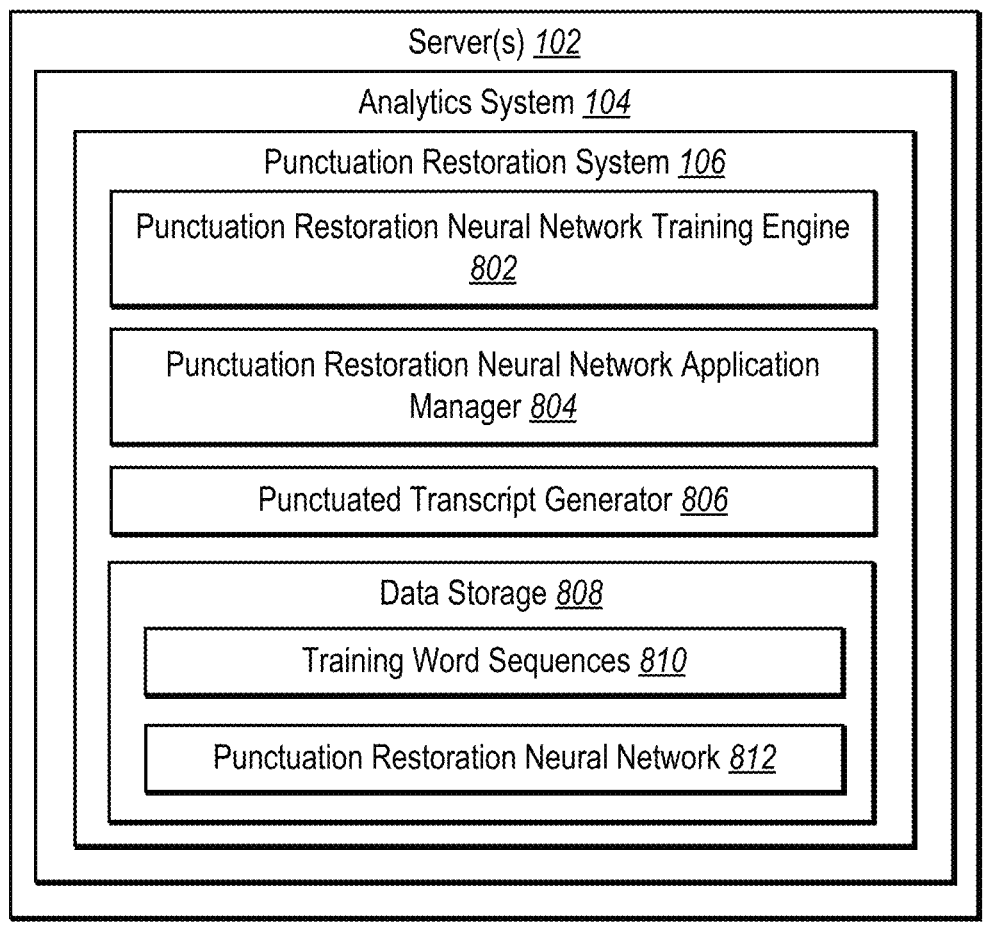
FIG. 8 illustrates an example schematic diagram of a punctuation restoration system in accordance with one or more embodiments.

Turning now to FIG. 8, additional detail will now be provided regarding various components and capabilities of the punctuation restoration system 106. In particular, FIG. 8 illustrates the punctuation restoration system 106 implemented by the server(s) 102 and the analytics system 104. As shown, the punctuation restoration system 106 can include, but is not limited to, a punctuation restoration neural network training engine 802, a punctuation restoration neural network application manager 804, a punctuated transcript generator 806, and data storage 808 (which includes training word sequences 810 and the punctuation restoration neural network 812).

As just mentioned, and as illustrated in FIG. 8, the punctuation restoration system 106 includes the punctuation restoration neural network training engine 802. In particular, the punctuation restoration neural network training engine 802 can train a punctuation restoration neural network to generate punctuation label probabilities used in generating punctuated transcripts. For example, the punctuation restoration neural network training engine 802 can train a punctuation restoration neural network using the training word sequences 810.

As shown in FIG. 8, the punctuation restoration system 106 can further include the punctuation restoration neural network application manager 804. In particular, the punctuation restoration neural network application manager 804 can use the punctuation restoration neural network trained by the punctuation restoration neural network training engine 802. For example, the punctuation restoration neural network application manager 804 can identify (e.g., receive) a transcript including a sequence of words and use a trained punctuation restoration neural network to generate punctuation label probabilities for each word in the sequence of words.

Additionally, as shown in FIG. 8, the punctuation restoration system 106 includes the punctuated transcript generator 806. In particular, the punctuated transcript generator 806 can generate punctuated transcripts corresponding to transcripts having an unpunctuated sequence of words. For example, the punctuated transcript generator 806 can use the punctuation label probabilities generated by the punctuation restoration neural network application manager 804 to associate punctuation with one or more words from a sequence of words. The punctuated transcript generator 806 can then generate a punctuated transcript having punctuation inserted before the associated words.

Further, as shown in FIG. 8, the punctuation restoration system 106 includes data storage 808. In particular, data storage 808 can include training word sequences 810 and the punctuation restoration neural network 812. Training word sequences 810 can include word sequences for training punctuation restoration neural networks. Training word sequences 810 can further include the ground truths (e.g., the punctuated versions of the word sequences). The punctuation restoration neural network training engine 802 can obtain the training data from training word sequences 810 when training the punctuation restoration neural network. The punctuation restoration neural network 812 can store the punctuation restoration neural network trained by the punctuation restoration neural network training engine 802 and used by the punctuation restoration neural network application manager 804 to generate punctuation label probabilities.

Each of the components 802-812 of the punctuation restoration system 106 can include software, hardware, or both. For example, the components 802-812 can include one or more instructions stored on a computer-readable storage medium and executable by processors of one or more computing devices, such as a client device or server device. When executed by the one or more processors, the computer-executable instructions of the punctuation restoration system 106 can cause the computing device(s) to perform the methods described herein. Alternatively, the components 802-812 can include hardware, such as a special-purpose processing device to perform a certain function or group of functions. Alternatively, the components 802-812 of the punctuation restoration system 106 can include a combination of computer-executable instructions and hardware.

Furthermore, the components 802-812 of the punctuation restoration system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-812 of the punctuation restoration system 106 may be implemented as a stand-alone application, such as a desktop or mobile application. Furthermore, the components 802-812 of the punctuation restoration system 106 may be implemented as one or more web-based applications hosted on a remote server. Alternatively, or additionally, the components 802-812 of the punctuation restoration system 106 may be implemented in a suite of mobile device applications or "apps." For example, in one or more embodiments, the punctuation restoration system 106 can comprise or operate in connection with digital software applications such as ADOBE® ANALYTICS CLOUD® or ADOBE® PREMIERE PRO®. "ADOBE," "ANALYTICS CLOUD," and "PREMIERE PRO" are either registered trademarks or trademarks of Adobe Inc. in the United States and/or other countries.

Figure 9:
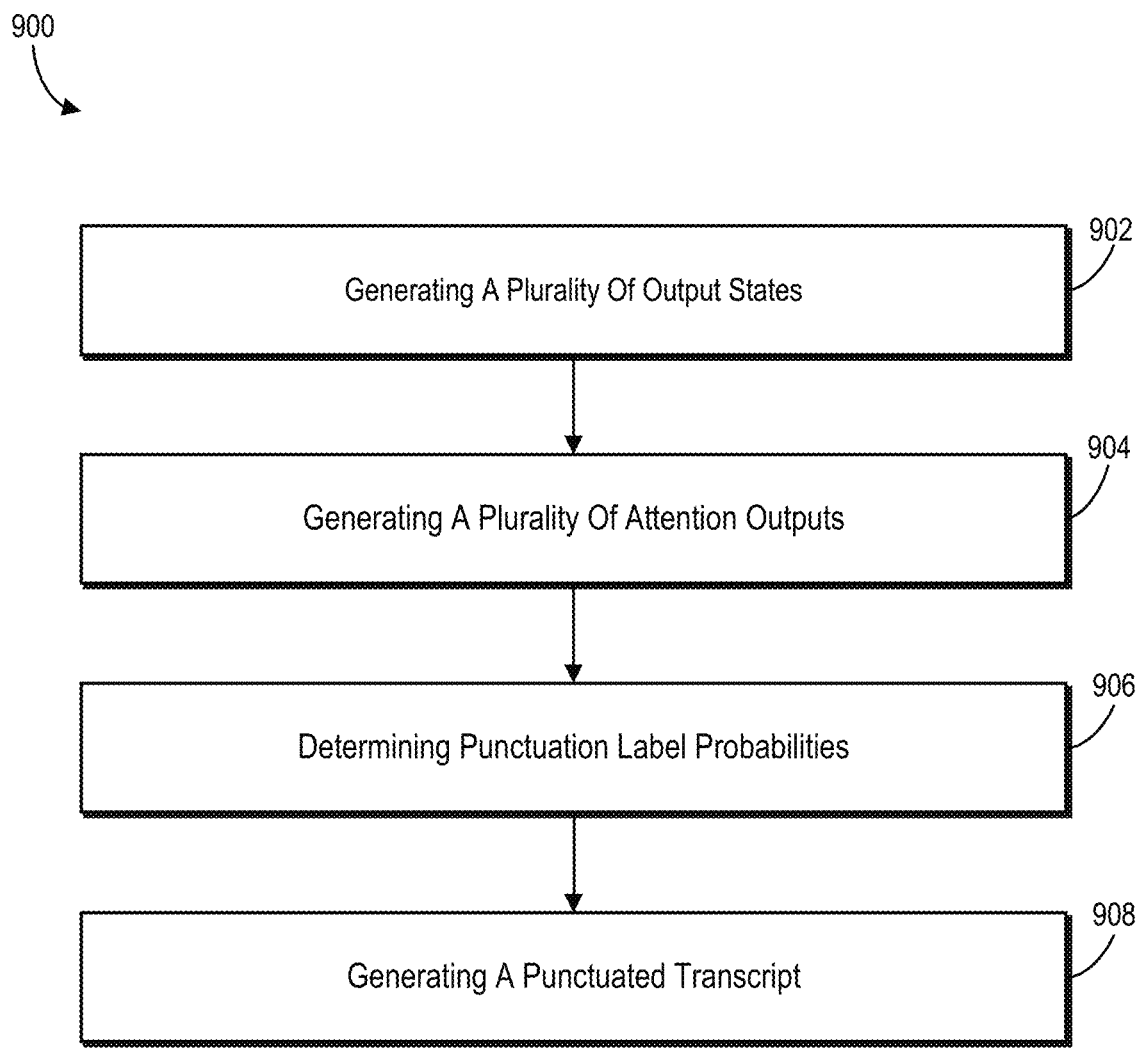
FIG. 9 illustrates a flowchart of a series of acts for generating a punctuated transcript in accordance with one or more embodiments.

FIGS. 1-8, the corresponding text, and the examples provide a number of different methods, systems, devices, and non-transitory computer-readable media of the punctuation restoration system 106. In addition to the foregoing, one or more embodiments can also be described in terms of flowcharts comprising acts for accomplishing the particular result, as shown in FIG. 9. FIG. 9 may be performed with more or fewer acts. Further, the acts may be performed in different orders. Additionally, the acts described herein may be repeated or performed in parallel with one another or in parallel with different instances of the same or similar acts.

As mentioned, FIG. 9 illustrates a flowchart of a series of acts 900 for generating a punctuated transcript in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. For example, in some embodiments, the acts of FIG. 9 can be performed, in a digital medium environment for using computer speech recognition technology to transcribe spoken language, as part of a computer-implemented method for generating punctuated transcripts. Alternatively, a non-transitory computer-readable medium can store instructions that, when executed by at least one processor, cause a computing device to perform the acts of FIG. 9. In some embodiments, a system can perform the acts of FIG. 9. For example, in one or more embodiments, a system includes a memory comprising a punctuation restoration neural network trained to generate punctuation label probabilities, the punctuation restoration neural network comprising a plurality of bi-directional recurrent neural network layers and one or more neural attention mechanisms. The system can further include at least one processor and at least one non-transitory computer-readable medium storing instructions thereon that, when executed by the at least one processor, cause the system to perform the acts of FIG. 9.

The series of acts 900 includes an act 902 of generating a plurality of output states. For example, the act 902 can involve generating, by each bi-directional recurrent neural network layer of a plurality of bi-directional recurrent neural network layers, a plurality of output states corresponding to words from a sequence of words. In one or more embodiments, the punctuation restoration system 106 generates, by each b-directional recurrent neural network layer of a punctuation restoration neural network by generating forward states and backward states and combining the forward states and backward states, wherein each state corresponds to words from a sequence of words. For example, the punctuation restoration system 106 can generate, by a given bi-directional recurrent neural network layer, the plurality of output states by generating a plurality of forward states by processing embeddings of the sequence of words in a forward direction utilizing a forward recurrent neural network layer of the given bi-directional recurrent neural network layer; generating a plurality of backward states by processing the embeddings of the sequence of words in a backward direction utilizing a backward recurrent neural network layer of the given bi-directional recurrent neural network layer; and combining the respective forward and backward states for each state.

In one or more embodiments, the punctuation restoration system 106 further generates a set of final states based on the plurality of output states. For example, the punctuation restoration system 106 can generate a set of final states based on the plurality of output states utilizing a gated recurrent unit of the punctuation restoration neural network.

The series of acts 900 also includes an act 904 of generating a plurality of attention outputs. For example, the act 904 can involve generating, utilizing one or more neural attention mechanisms, a plurality of attention outputs based on the plurality of output states. In one or more embodiments, the punctuation restoration system 106 generates, utilizing the one or more neural attention mechanisms, the plurality of attention outputs by combining the plurality of output states from each bi-directional layer and the set of final states.

In one or more embodiments, the one or more neural attention mechanisms comprise a multi-head neural attention mechanism and the punctuation restoration system 106 can utilize the multi-head neural attention mechanism to generate a plurality of attention weights for each state. The punctuation restoration system 106 can then generate the plurality of attention outputs by combining (e.g., concatenating), for a given state, the plurality of attention weights corresponding to the state.

In some embodiments, the one or more neural attention mechanisms comprise a plurality of neural attention mechanisms and each neural attention mechanism from the plurality of neural attention mechanisms corresponds to a bi-directional recurrent neural network layer from the plurality of bi-directional recurrent neural network layers. The punctuation restoration system 106 can generate, by each neural attention mechanism, a layer-wise attention weight for each output state from the plurality of output states of a corresponding bi-directional recurrent neural network layer. In other words, the one or more neural attention mechanisms can include a neural attention mechanism for each bi-directional recurrent neural network layer and the punctuation restoration system 106 generates, by each neural attention mechanism, a layer-wise attention weight for each output state from the plurality of output states of a corresponding bi-directional recurrent neural network layer. The punctuation restoration system 106 can then generate the plurality of attention outputs by concatenating, for a given state, the layer-wise attention weight corresponding to the state from each neural attention mechanism. In some embodiments, the punctuation restoration system 106 generates, by each neural attention mechanism, the layer-wise attention weight for each output state from the plurality of output states based on the output state and at least one final state from the set of final states and combines, for a given state, the layer-wise attention weight corresponding to the state from each neural attention mechanism. In further embodiments, each neural attention mechanism from the plurality of neural attention mechanisms (i.e., the one or more neural attention mechanisms) comprises a multi-head neural attention mechanism and the punctuation restoration system 106 utilizes each multi-head neural attention mechanism to generate a plurality of layer-wise attention weights for each state. The punctuation restoration system 106 can then generate the plurality of attention outputs by combining (e.g., concatenating), for a given state, the plurality of layer-wise attention weights corresponding to the state from each neural attention mechanism.

In one or more embodiments, the one or more neural attention mechanisms comprise one or more scaled dot-product neural attention mechanisms.

The series of acts 900 further includes an act 906 of determining punctuation label probabilities. For example, the act 906 can involve determining punctuation label probabilities for the words from the sequence of words based on the plurality of output states and the plurality of attention outputs. Specifically, determining the punctuation label probabilities can include determining the punctuation label probabilities for the words from the sequence of words based on the set of final states and the plurality of attention outputs. In one or more embodiments, the punctuation restoration system 106 determines the punctuation label probabilities for the words from the sequence of words based on the set of final states and the plurality of attention outputs utilizing a fully connected layer with a SoftMax classifier to generate, for a given word of the sequence of words, a punctuation label probability for each of a plurality of punctuation marks.

Additionally, the series of acts 900 includes an act 908 of generating a punctuated transcript. For example, the act 908 can involve generating a punctuated transcript comprising punctuation before one or more of the words from the sequence of words based on the punctuation label probabilities.

In one or more embodiments, the series of acts 900 also includes acts for identifying a transcript comprising the sequence of words. For example, in one or more embodiments, identifying the transcript can include generating the transcript based on received audio data. In some embodiments, identifying the transcript can include receiving the transcript (e.g., from a client device or a third-party system). In such embodiments, generating a punctuated transcript can include generating a punctuated transcript corresponding to the transcript based on the punctuation label probabilities.

In some embodiments, the series of acts 900 further includes acts for utilizing the punctuated transcript. For example, in one or more embodiments, the acts include performing a language understanding task based on the punctuated transcript, the language understanding task comprising at least one of generating a translation, generating a transcript summary, determining an answer to a question, performing sentiment analysis, performing syntactic parsing, or extracting information.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
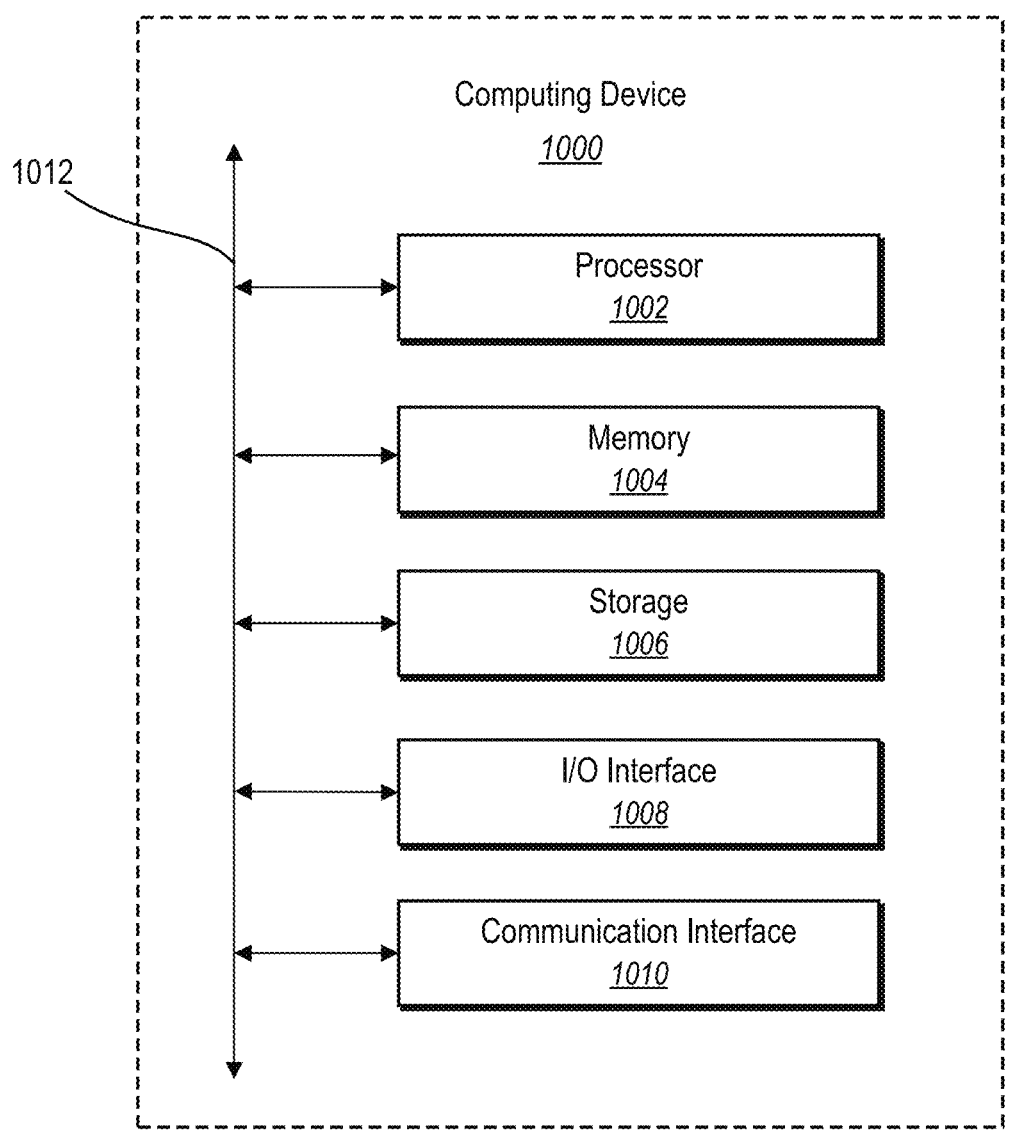
FIG. 10 illustrates a block diagram of an exemplary computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 102, client devices 112a-112n, and the third-party system 108). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 including storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions thereon that, when executed by at least one processor, cause a computing device to:
generate, by each bi-directional recurrent neural network layer of a plurality of bi-directional recurrent neural network layers of a punctuation restoration neural network, a plurality of output states corresponding to words from a sequence of words;
generate, utilizing a gated recurrent unit of the punctuation restoration neural network, a set of final states based on the plurality of output states;
generate, utilizing a plurality of neural attention mechanisms of the punctuation restoration neural network, a plurality of attention outputs based on the plurality of output states, wherein each neural attention mechanism is associated with a bi-directional recurrent neural network layer from the plurality of bi-directional recurrent neural network layers and generates, for at least one state of the punctuation restoration neural network, one or more attention outputs based on the plurality of output states of the bi-directional recurrent neural network layer and a final state from the set of final states that corresponds to a previous state of the punctuation restoration neural network;

determine punctuation label probabilities for the words from the sequence of words based on the set of final states and the plurality of attention outputs; and generate a punctuated transcript comprising punctuation before one or more words from the sequence of words based on the punctuation label probabilities.

2. The non-transitory computer-readable medium of claim 1, wherein:

the instructions, when executed by the at least one processor, cause the computing device to generate, by each neural attention mechanism, a layer-wise attention weight for each output state from the plurality of output states of an associated bi-directional recurrent neural network layer.

3. The non-transitory computer-readable medium of claim 2, wherein the instructions, when executed by the at least one processor, cause the computing device to generate the plurality of attention outputs by concatenating, for a given state of the punctuation restoration neural network, the layer-wise attention weight corresponding to the given state from each neural attention mechanism.

4. The non-transitory computer-readable medium of claim 3, wherein:

each neural attention mechanism from the plurality of neural attention mechanisms comprises a multi-head neural attention mechanism; and the instructions, when executed by the at least one processor, cause the computing device to:

utilize each multi-head neural attention mechanism to generate a plurality of layer-wise attention weights for each state of the punctuation restoration neural network; and generate the plurality of attention outputs by concatenating, for a given state of the punctuation restoration neural network, the plurality of layer-wise attention weights corresponding to the given state from each neural attention mechanism.

5. The non-transitory computer-readable medium of claim 1, wherein the plurality of neural attention mechanisms comprises one or more scaled dot-product neural attention mechanisms.

6. The non-transitory computer-readable medium of claim 1, wherein instructions, when executed by the at least one processor, cause the computing device to generate the set of final states based on the plurality of output states by generating for each state of the punctuation restoration neural network, a final state based on an output state that corresponds to the state of the punctuation restoration neural network.

7. The non-transitory computer-readable medium of claim 6, wherein the instructions, when executed by the at least one processor, cause the computing device to determine the punctuation label probabilities for the words from the sequence of words based on the set of final states and the plurality of attention outputs utilizing a fully connected layer with a SoftMax classifier to generate, for a given word of the sequence of words, a punctuation label probability for each of a plurality of punctuation marks.

8. The non-transitory computer-readable medium of claim 1, wherein the instructions, when executed by the at least one processor, cause the computing device to generate, by a given bi-directional recurrent neural network layer, the plurality of output states by:

generating a plurality of forward states by processing embeddings of the sequence of words in a forward direction utilizing a forward recurrent neural network layer of the given bi-directional recurrent neural network layer;

generating a plurality of backward states by processing the embeddings of the sequence of words in a backward direction utilizing a backward recurrent neural network layer of the given bi-directional recurrent neural network layer; and combining, for each state of the punctuation restoration neural network, a forward state and a backward state corresponding to the state of the punctuation restoration neural network.

9. The non-transitory computer-readable medium of claim 1, further storing instructions that, when executed by the at least one processor, cause the computing device to perform a language understanding task based on the punctuated transcript, the language understanding task comprising at least one of generating a translation, generating a transcript summary, determining an answer to a question, performing sentiment analysis, performing syntactic parsing, or extracting information.

10. A system comprising:

a memory comprising a punctuation restoration neural network trained to generate punctuation label probabilities, the punctuation restoration neural network comprising a plurality of bi-directional recurrent neural network layers and a plurality of neural attention mechanisms, wherein each neural attention mechanism is associated with a bi-directional recurrent neural network layer from the plurality of bi-directional recurrent neural network layers;

at least one processor; and at least one non-transitory computer-readable medium storing instructions thereon that, when executed by the at least one processor, cause the system to:

generate, by each bi-directional recurrent neural network layer of the punctuation restoration neural network, a plurality of output states by generating forward states and backward states and combining the forward states and backward states, wherein each state of the punctuation restoration neural network corresponds to words from a sequence of words;

generate a set of final states based on the plurality of output states utilizing a gated recurrent unit of the punctuation restoration neural network;

generate, utilizing the plurality of neural attention mechanisms, a plurality of attention outputs by utilizing each neural attention mechanism to generate, for at least one state of the punctuation restoration neural network, one or more attention outputs based on the plurality of output states of an associated bi-directional recurrent neural network layer and a final state from the set of final states that corresponds to a previous state of the punctuation restoration neural network;

determine punctuation label probabilities for the words from the sequence of words based on the set of final states and the plurality of attention outputs; and generate a punctuated transcript comprising punctuation before one or more of the words from the sequence of words based on the punctuation label probabilities.

11. The system of claim 10, wherein:

the instructions, when executed by the at least one processor, cause the system to generate, by each neural attention mechanism, a layer-wise attention weight for each output state from the plurality of output states of a corresponding bi-directional recurrent neural network layer.

12. The system of claim 11, wherein:
each neural attention mechanism from the plurality of neural attention mechanisms comprises a multi-head neural attention mechanism; and
the instructions, when executed by the at least one processor, cause the system to:
utilize each multi-head neural attention mechanism to generate a plurality of layer-wise attention weights for each state of the punctuation restoration neural network; and
generate the plurality of attention outputs by combining, for a given state of the punctuation restoration neural network, the plurality of layer-wise attention weights corresponding to the given state from each neural attention mechanism.

13. The system of claim 11, wherein the instructions, when executed by the at least one processor, cause the system to generate the plurality of attention outputs by:
combining, for a given state of the punctuation restoration neural network, the layer-wise attention weight corresponding to the given state from each neural attention mechanism.

14. The system of claim 10, wherein the plurality of neural attention mechanisms comprise one or more scaled dot-product neural attention mechanisms.

15. The system of claim 10, wherein:
at least one neural attention mechanism from the plurality of neural attention mechanisms comprises a multi-head neural attention mechanism; and
the instructions, when executed by the at least one processor, cause the system to:
utilize the multi-head neural attention mechanism to generate a plurality of attention weights for each state of the punctuation restoration neural network; and
generate the plurality of attention outputs by concatenating, for a given state of the punctuation restoration neural network, the plurality of attention weights corresponding to the given state.

16. The system of claim 10, further storing instructions that, when executed by the at least one processor, cause the system to perform a language understanding task based on the punctuated transcript, the language understanding task comprising at least one of generating a translation, generation a transcript summary, determining an answer to a question, performing sentiment analysis, performing syntactic parsing, or extracting information.

17. The system of claim 10, further storing instructions that, when executed by the at least one processor, cause the system to determine punctuation label probabilities for the words from the sequence of words based on the set of final states and the plurality of attention outputs utilizing a fully connected layer with a SoftMax classifier to generate, for a given word of the sequence of words, a punctuation label probability for each of a plurality of punctuation marks.

18. In a digital medium environment for using computer speech recognition technology to transcribe spoken language, a computer-implemented method comprising:
generating, by each bi-directional recurrent neural network layer of a plurality of bi-directional recurrent neural network layers of a punctuation restoration neural network, a plurality of output states corresponding to words from a sequence of words;
generating, utilizing a gated recurrent unit of the punctuation restoration neural network, a set of final states based on the plurality of output states;
generating, utilizing a plurality of neural attention mechanisms of the punctuation restoration neural network, a plurality of attention outputs based on the plurality of output states, wherein each neural attention mechanism is associated with a bi-directional recurrent neural network layer from the plurality of bi-directional recurrent neural network layers and generates, for at least one state of the punctuation restoration neural network, one or more attention outputs based on the plurality of output states of the bi-directional recurrent neural network layer and a final state from the set of final states that corresponds to a previous state of the punctuation restoration neural network;
determining punctuation label probabilities for the words from the sequence of words based on the set of final states and the plurality of attention outputs; and
generating a punctuated transcript comprising punctuation before one or more words from the sequence of words based on the punctuation label probabilities.

19. The computer-implemented method of claim 18, further comprising generating a transcript that includes the sequence of words for provision to the punctuation restoration neural network based on received audio data.

20. The computer-implemented method of claim 18, further comprising determining, for a word from the sequence of words, an associated punctuation mark by selecting a punctuation mark corresponding to a highest punctuation label probability for the word.

* * * * *